US010061517B2

(12) United States Patent
Shimizu et al.

(10) Patent No.: US 10,061,517 B2
(45) Date of Patent: Aug. 28, 2018

(54) APPARATUS AND METHOD FOR DATA ARRANGEMENT

(71) Applicant: FUJITSU LIMITED, Kawasaki-shi, Kanagawa (JP)

(72) Inventors: Toshihiro Shimizu, Kawasaki (JP); Haruyasu Ueda, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/014,409

(22) Filed: Feb. 3, 2016

(65) Prior Publication Data

US 2016/0246710 A1   Aug. 25, 2016

(30) Foreign Application Priority Data

Feb. 20, 2015   (JP) ................................. 2015-031876

(51) Int. Cl.
G06F 13/00   (2006.01)
G06F 3/06   (2006.01)

(52) U.S. Cl.
CPC .............. *G06F 3/061* (2013.01); *G06F 3/064* (2013.01); *G06F 3/0676* (2013.01)

(58) Field of Classification Search
CPC ......... G06F 3/061; G06F 3/064; G06F 3/0676
See application file for complete search history.

(56) References Cited

U.S. PATENT DOCUMENTS

| 6,871,328 B1* | 3/2005 | Fung ................... G06F 17/5054 716/113 |
| 2006/0218367 A1* | 9/2006 | Ukai ....................... G06F 3/061 711/165 |
| 2012/0005453 A1* | 1/2012 | Saika ...................... G06F 3/061 711/207 |
| 2012/0072698 A1 | 3/2012 | Unesaki et al. |
| 2012/0137278 A1* | 5/2012 | Draper ....................... G06F 8/65 717/170 |
| 2012/0173801 A1* | 7/2012 | Sasaki ................... G06F 3/0613 711/103 |

(Continued)

FOREIGN PATENT DOCUMENTS

JP   11-85411   3/1999
JP   2010-237837   10/2010

(Continued)

*Primary Examiner* — Nanci N Wong
(74) *Attorney, Agent, or Firm* — Fujitsu Patent Center

(57) ABSTRACT

A data arrangement apparatus calculates evaluation values for individual relocation processes generated based on an access pattern. Each of the relocation processes indicates a relocation of some of a plurality of unit data pieces in a storage device. The data arrangement apparatus selects, amongst influence range levels whose ranges in relation to unit data pieces to be affected by the relocation differ in extent of influence, one influence range level based on the evaluation values and coefficients associated one-to-one with the influence range levels. Based on the extent of influence indicated by the selected influence range level, the data arrangement apparatus determines one or more relocation processes to be executed amongst the generated relocation processes. Based on access status after the determined relocation processes are executed, the data arrangement apparatus updates a coefficient associated with the selected influence range level.

7 Claims, 25 Drawing Sheets

(56) References Cited

U.S. PATENT DOCUMENTS

2014/0114933 A1* 4/2014 Chandrasekarasastry ................... G06F 12/02
707/692
2014/0337342 A1   11/2014 Kobashi et al.
2014/0337834 A1* 11/2014 Adogla ............... G06F 9/45558
718/1

FOREIGN PATENT DOCUMENTS

| JP | 2011-145901 | 7/2011 |
| JP | 2012-064158 | 3/2012 |
| WO | 2011/019029 | 2/2011 |
| WO | 2013/114538 | 8/2013 |

* cited by examiner

CONTROL INFORMATION STORING UNIT — 123

SEARCH TABLE — 141

| DATA ID | PAGE ID |
|---------|---------|
| a | P |
| b | P |
| c | P |
| d | Q |
| ⋮ | ⋮ |

REVERSE SEARCH TABLE — 142

| PAGE ID | DATA ID | UPDATE FLAG | RELOCATION FLAG |
|---------|---------|-------------|-----------------|
| P | a, b, c | 0 | 0 |
| Q | d, e, g | 1 | 1 |
| R | f, h, i | 0 | 1 |
| S | j, k, l | 0 | 0 |
| ⋮ | ⋮ | ⋮ | ⋮ |

FIG. 12

123 CONTROL INFORMATION STORING UNIT

OVERLAP DETERMINATION TABLE — 145

| DATA ID | INFLUENCE FLAG |
|---|---|
| a | 1 |
| b | 0 |
| c | 1 |
| ⋮ | ⋮ |

PARAMETER TABLE — 146

| PARAMETER NAME | VALUE |
|---|---|
| WRITING SPEED | xxx ms/PAGE |
| READING SPEED | xxx ms/PAGE |
| RECURRENCE RATE | xxx |
| ⋮ | ⋮ |

FIG. 14

CONTROL INFORMATION STORING UNIT

HISTORY TABLE  147

| DATA ID | RELOCATION FLAG |
|---------|-----------------|
| a | 1 |
| b | 0 |
| c | 0 |
| ⋮ | ⋮ |

INTERFERENCE RATE TABLE  148

| INFLUENCE RANGE LEVEL | INTERFERENCE RATE | TOTAL EVALUATION VALUE | CACHE MISS COUNT |
|-----------------------|-------------------|------------------------|------------------|
| RELOCATION DATA | E1/C1 | E1 | C1 |
| DIRECT ASSOCIATION DATA | E2/C2 | E2 | C2 |
| PAGE | E3/C3 | E3 | C3 |

FIG. 15

CONTROL INFORMATION STORING UNIT — 123

COORDINATE TABLE — 149

| NODE ID | COORDINATES |
|---------|-------------|
| Q | (1, 6) |
| R | (5, 2) |
| e | (6, 3) |
| f | (3, 6) |
| g | (4, 3) |
| h | (4, 1) |
| ⋮ | ⋮ |

FIG. 19

APPARATUS AND METHOD FOR DATA ARRANGEMENT

CROSS-REFERENCE TO RELATED APPLICATION

This application is based upon and claims the benefit of priority of the prior Japanese Patent Application No. 2015-031876, filed on Feb. 20, 2015, the entire contents of which are incorporated herein by reference.

FIELD

The embodiments discussed herein are related to a data arrangement apparatus and a data arrangement method.

BACKGROUND

In the case where a computer handles large amounts of data, a low-speed and large-capacity storage device, such as a hard disk drive (HDD), is often employed as non-volatile storage for storing the data. However, if access is made to the low-speed storage device each time an access request is issued, the data access may act as a bottleneck and decrease the processing performance of the computer. One solution to this problem is to use high-speed random-access memory, such as random access memory (RAM), as cache memory.

For example, there has been proposed a data management apparatus configured to store data in a HDD by grouping a plurality of unit data pieces into each "segment" and, then, cache the whole segment from the HDD to RAM. Upon receiving a read request with designation of a unit data piece, the data management apparatus loads an entire segment including the designated unit data piece from the HDD into the RAM. The unit data piece loaded (cached) into the RAM is left without being discarded immediately. Later, upon receiving a read request with designation of a unit data piece being cached, the data management apparatus provides the designated unit data piece by reading it not from the HDD but from the RAM.

In addition, the data management apparatus records the history of read requests and analyzes the association among unit data pieces likely to be read successively. The data management apparatus changes the arrangement of unit data pieces in the HDD in such a manner that the unit data pieces likely to be read successively belong to the same segments. This increases the likelihood that designated unit data pieces have already been cached in the RAM and therefore reduces access to the HDD, thus improving the access performance.

See, for example, International Publication Pamphlet No. WO 2013114538.

It is sometimes the case that a plurality of relocation process options for changing the arrangement of some unit data pieces in a storage device are generated in a short amount of time. When a plurality of relocation process options are generated, they may be sequentially evaluated to determine whether to execute each of the relocation processes. Assume, for example, that the following two relocation processes are generated as options: a relocation process #1 for transferring unit data #1 close to unit data #2; and a relocation process #2 for transferring the unit data #2 close to unit data #3. The former relocation process may be generated when access has been made successively to the unit data #1 and #2, while the latter relocation process may be generated when access has been made successively to the unit data #2 and #3. In this case, the relocation process #1 is evaluated based on the current unit data arrangement, and then executed if the relocation process #1 is highly evaluated (i.e., if transferring the unit data #1 is determined to promote access efficiency). Subsequently, the relocation process #2 is evaluated based on arrangement obtained after the execution of the relocation process #1. In this regard, the relocation process #2 is evaluated in consideration of the disadvantage of the unit data #2 being moved away from the unit data #1.

On the other hand, the method of sequentially evaluating a plurality of relocation processes and determining whether to execute each of the relocation processes may take a long time until examination of all the relocation processes is completed. In view of this, it may be considered reasonable to perform the evaluation and execution of a plurality of relocation processes in parallel. However, in the case of evaluating a plurality of relocation processes in parallel, interference between/among relocation processes is going to be a problem. Assume, for example, the case in which both the relocation processes #1 and #2 above are highly assessed in individual evaluations based on the current unit data arrangement. When both the relocation processes #1 and #2 are executed, however, the effect expected from the relocation process #1 may not be obtained because the unit data #2 is separated away from the unit data #1. If this is the case, the final unit data arrangement is likely to have a low evaluation. This may be said that the relocation process #1 is subject to interference from the relocation process #2. That is, additivity is not always observed in the evaluation values of a plurality of relocation processes and there is, therefore, little point in simply combining relocation processes individually having high evaluation values.

To manage this problem, it may be considered appropriate to calculate, for each of all possible combinations of the relocation processes, unit data arrangement to be obtained after the execution of the relocation process combination and, then, directly evaluate the calculated arrangement, to thereby find an optimal relocation process combination. In this case, however, assuming that N relocation processes have been generated, a maximum of $2^N$ (2 to the power of N) combinations need to be evaluated, possibly needing a huge computational effort. In addition, it may be considered appropriate to execute, among the relocation processes, only a small number of relocation processes clearly causing no interference to each other. This, however, reduces the number of relocation processes selectable at the same time, possibly inducing a decrease in the accuracy in optimizing data arrangement.

SUMMARY

According to an aspect, there is provided a non-transitory computer-readable storage medium storing a computer program that causes a computer to perform a procedure including calculating an evaluation value for each of a plurality of relocation process options generated based on an access pattern to a plurality of unit data pieces stored in a storage device, each of the generated relocation process options indicating a relocation of one or more of the stored unit data pieces within the storage device; selecting, amongst a plurality of influence range levels whose ranges in relation to unit data pieces to be affected by the relocation differ in extent of influence, one influence range level based on the calculated evaluation values of the generated relocation process options and coefficients associated one-to-one with the influence range levels; determining, amongst the generated relocation process options, one or more relocation processes to be executed based on the extent of influence indicated by the selected influence range level; and updating the coefficient associated with the selected influence range level based on status of access to the stored unit data pieces after the determined relocation processes are executed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 illustrates an example of a search table and a reverse search table;

FIG. 14 illustrates an example of an overlap determination table and a parameter table;

FIG. 15 illustrates an example of a history table and an interference rate table;

FIG. 19 illustrates an example of a coordinate table;

DESCRIPTION OF EMBODIMENTS

Figure 1:
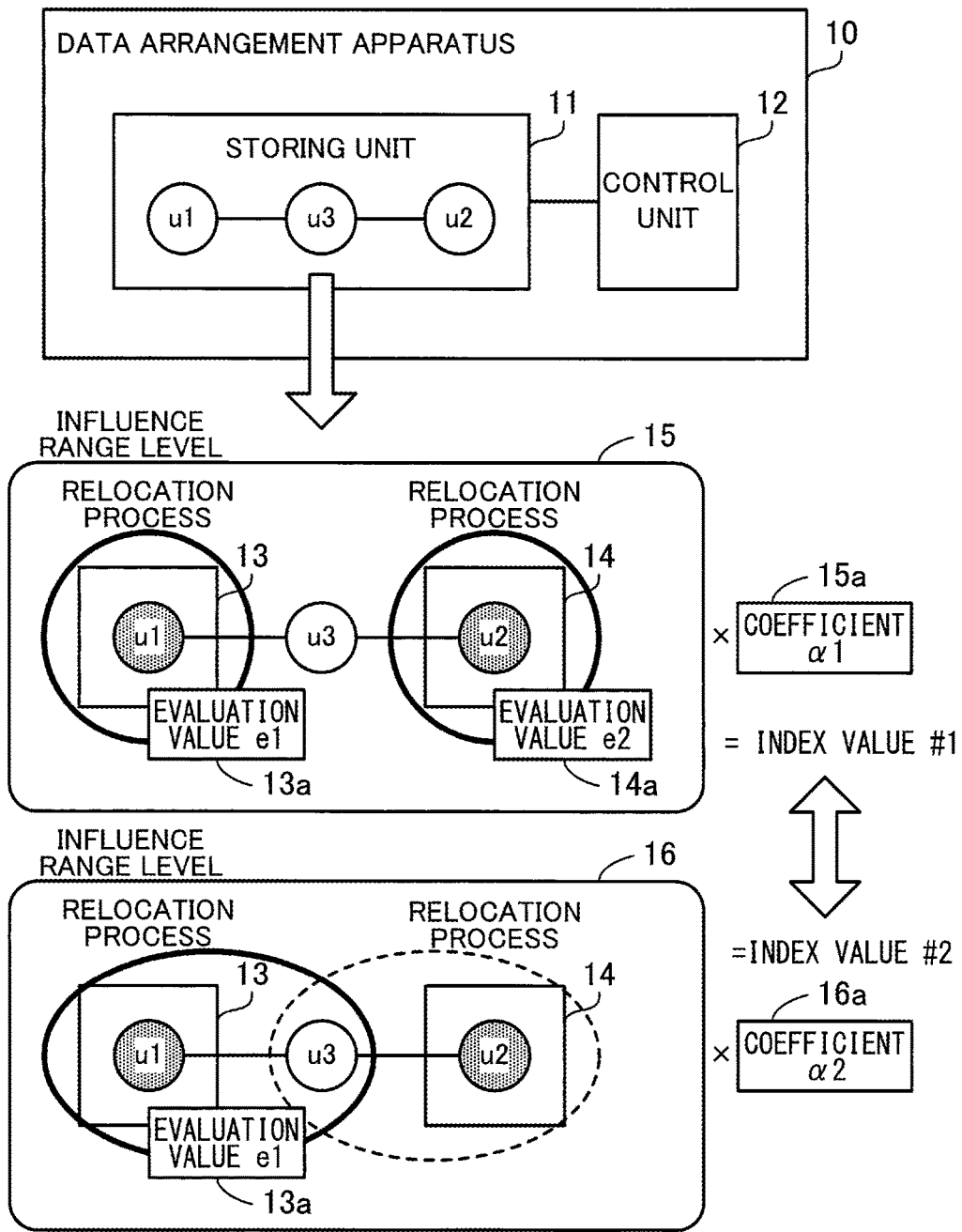
FIG. 1 illustrates a data arrangement apparatus according to a first embodiment.

Several embodiments will be described below with reference to the accompanying drawings, wherein like reference numerals refer to like elements throughout.

(a) First Embodiment

Next described is a first embodiment. FIG. 1 illustrates a data arrangement apparatus according to the first embodiment. A data arrangement apparatus 10 of the first embodiment includes a storing unit 11 and a control unit 12. The storing unit 11 is a storage device enabling relatively low-speed random access capability. A HDD, a tape, a rewritable disk medium, or non-volatile semiconductor memory, for example, is used as the storing unit 11. The data arrangement apparatus 10 may use, as cache memory for the storing unit 11, a storage device enabling relatively high-speed random access capability. As such cache memory, RAM or flash memory may be used, for example. Note that a storage device corresponding to the storing unit 11 may be provided external to the data arrangement apparatus 10.

The control unit 12 controls data arrangement in the storing unit 11 in such a manner as to improve access performance to the storing unit 11. The control unit 12 may be implemented using, for example, a processor. The processor may be a central processing unit (CPU) or a digital signal processor (DSP). In addition, the processor may include an electronic circuit designed for specific use, such as an application specific integrated circuit (ASIC) or a field programmable gate array (FPGA). The processor executes programs stored in memory, such as RAM. The term "processor" here includes a set of multiple processors (i.e., multiprocessor).

The storing unit 11 stores therein a plurality of unit data pieces including unit data u1, u2, and u3. The unit data u1 and u3 are in association with each other. For example, access was made successively to the unit data u1 and u3 in the past. In addition, the unit data u2 and u3 are in association with each other. For example, access was made successively to the unit data u2 and u3 in the past. Higher access efficiency is achieved when associated unit data pieces are stored, within the storing unit 11, in areas closer to each other.

Based on an access pattern to unit data pieces stored in the storing unit 11, the control unit 12 generates a plurality of relocation processes, including relocation processes 13 and 14, as options of relocation processes to be executed. Each relocation process indicates a relocation of some (one or more) unit data pieces within the storing unit 11. For example, the control unit 12 records access history of unit data pieces, and generates each relocation process in such a manner that a pair of unit data pieces more often accessed successively is stored, within the storing unit 11, in areas closer to each other. The relocation process 13 includes a relocation of the unit data u1. The relocation process 14 includes a relocation of the unit data u2. Note that a single relocation process may include relocations of two or more unit data pieces.

For each of the generated relocation processes, the control unit 12 calculates an evaluation value using a predetermined evaluation function. The evaluation value indicates the degree of improvement expected in the access performance by a relocation of one or more unit data pieces. The evaluation value is, for example, a value obtained by subtracting the cost of write operations involved in the relocation from a predicted reduction in the cost of read operations. To calculate the evaluation value, the following are used as parameters, for example: the frequency of associated unit data pieces being accessed successively; and the reading speed and the writing speed of the storing unit 11. For the relocation process 13, an evaluation value 13a (evaluation value e1) is calculated. For the relocation process 14, an evaluation value 14a (evaluation value e2) is calculated. Assume here that the evaluation value 13a is larger than the evaluation value 14a (i.e., e1>e2).

The control unit 12 selects one assumed influence range level amongst a plurality of influence range levels including influence range levels 15 and 16. Each influence range level indicates the influence extent in relation to unit data pieces affected by a relocation process. For example, assume that, at the influence range level 15, only a unit data piece to be relocated by a relocation process is affected by the relocation process in terms of the access performance. Assume also that, at the influence range level 16, not only a unit data piece to be relocated by a relocation process but also a different unit data piece associated with the unit data piece to be relocated is affected by the relocation process.

In selecting an influence range level, the control unit 12 uses the evaluation value calculated for each of the relocation processes and a coefficient associated in advance with each of the influence range levels. A coefficient 15a (coefficient $\alpha 1$) is associated with the influence range level 15, and a coefficient 16a (coefficient $\alpha 2$) is associated with the influence range level 16. Each coefficient indicates the degree of unexpected interference occurring between/among a plurality of relocation processes whose assumed influence ranges do not overlap each other. At an influence range level with a smaller assumed influence range, higher interference occurs in reality between/among a plurality of relocation processes. Because a relocation process produces smaller effects with higher interference, a lower coefficient is assigned to an influence range level with a smaller assumed influence range. That is, the coefficient 15a is lower than the coefficient 16a (i.e., $\alpha 1 < \alpha 2$).

As for the influence range level 15, for example, the control unit 12 selects relocation processes in such a manner that their influence ranges do not overlap each other. At the influence range level 15, the influence range of the relocation process 13 includes only the unit data u1, and the influence range of the relocation process 14 includes only the unit data u2. Therefore, the control unit 12 selects the relocation processes 13 and 14. Then, the control unit 12 calculates an index value #1 (IDV#1) for the influence range level 15 by using the evaluation values 13a and 14a of the selected relocation processes 13 and 14 and the coefficient 15a assigned to the influence range level 15. For example, the control unit 12 calculates the index value #1 as follows: IDV#1=(e1+e2)×$\alpha 1$.

In a similar fashion, as for the influence range level 16, the control unit 12 selects relocation processes in such a manner that their influence ranges do not overlap each other. At the influence range level 16, the influence range of the relocation process 13 includes the unit data u1 and u3, and the influence range of the relocation process 14 includes the unit data u2 and u3. Because the influence ranges of the relocation processes 13 and 14 overlap each other, one or the other of the relocation processes 13 and 14 is selected. In this case, the control unit 12 selects the relocation process 13 with a higher evaluation value. Then, the control unit 12 calculates an index value #2 (IDV#2) for the influence range level 16 by using the evaluation values 13a of the selected relocation process 13 and the coefficient 16a assigned to the influence range level 16. For example, the control unit 12 calculates the index value #2 as follows: IDV#2=e1×$\alpha 2$.

Subsequently, the control unit 12 compares, for example, the index value #1 of the influence range level 15 and the index value #2 of the influence range level 16, and selects one of the influence range levels 15 and 16, having a higher index value. This means determining whether it is better to execute a number of relocation processes even if high interference occurs or to execute a fewer selected relocation processes so as to avoid interference. Based on the selected influence range level, the control unit 12 determines, amongst the generated relocation process options, one or more relocation processes to be executed. For example, in the case of IDV#1>IDM#2, the control unit 12 determines to execute the relocation processes 13 and 14 selected according to the influence range level 15. On the other hand, in the case of IDM#1<IDM#2, the control unit 12 determines to execute the relocation process 13 selected according to the influence range level 16. Note that, according to the example of FIG. 1, either one of the influence range levels 15 and 16 is selected; however, the selection may be made from among three or more influence range levels.

The control unit 12 executes the determined relocation process/es. Subsequently, the control unit 12 monitors the status of access to unit data pieces, and updates the coefficient associated with the selected influence range level based on the access status. This means undertaking ex-post confirmation of whether an improvement in the access performance expected from the executed relocation process/es has been produced, and reflecting, if the expected improvement has not taken place, the degree of a decrease in the access performance improvement due to interference to the coefficient. According to the above-described example, the control unit 12 updates the coefficient 15a when having selected the influence range level 15, and updates the coefficient 16a when having selected the influence range level 16. For example, the control unit 12 counts the number of times an access-target unit data piece has not been loaded into the cache memory (i.e., the number of cache misses), and then updates the coefficient according to the ratio of the sum of the evaluation value/s of the executed relocation process/es to the number of cache misses.

The data arrangement apparatus 10 according to the first embodiment calculates an evaluation value for each of a plurality of relocation processes, and selects one influence range level based on the evaluation values of the individual relocation processes and coefficients each associated with one of a plurality of influence range levels. Then, according to the selected influence range level, the data arrangement apparatus 10 determines a relocation process/es to be executed. Further, the data arrangement apparatus 10 updates the coefficient of the selected influence range level based on the status of access to unit data pieces after the execution of the relocation process/es.

This enables evaluation of a plurality of relocation processes in parallel and execution of two or more relocation processes selected therefrom in any order. Therefore, compared to the case of sequentially evaluating a plurality of relocation processes to determine whether to execute each of the relocation processes, less time is needed for examination of all the generated relocation processes being completed. In addition, the evaluation value needs to be calculated only for each of the relocation processes, and there is no need to calculate evaluation values for combinations of two or more relocation processes. As a result, the need to calculate a huge number of combinations is eliminated, thus reducing the computation load of the data arrangement apparatus 10.

In addition, in determining a relocation process/es to be executed, a plurality of influence range levels whose assumed influence ranges differ in the extent of the influence are examined. This allows consideration of interference between/among relocation processes without direct evaluation of combinations of two or more relocation processes, and also enables the number of relocation processes to be executed to be appropriately adjusted. That is, it is possible to reduce the possibility of the access performance being not sufficiently improved due to a too small number of relocation processes being executed, and also reduces the possibility of expected effects not being achieved because of interference among relocation processes due to too many relocation processes being executed. In addition, after execution of the relocation process/es, the access performance is monitored and a corresponding coefficient indicating the degree of interference is updated. This improves the accuracy in determining a relocation process/es next time. As described above, it is possible to efficiently determine a combination of relocation processes to be executed.

(b) Second Embodiment

Figure 2:
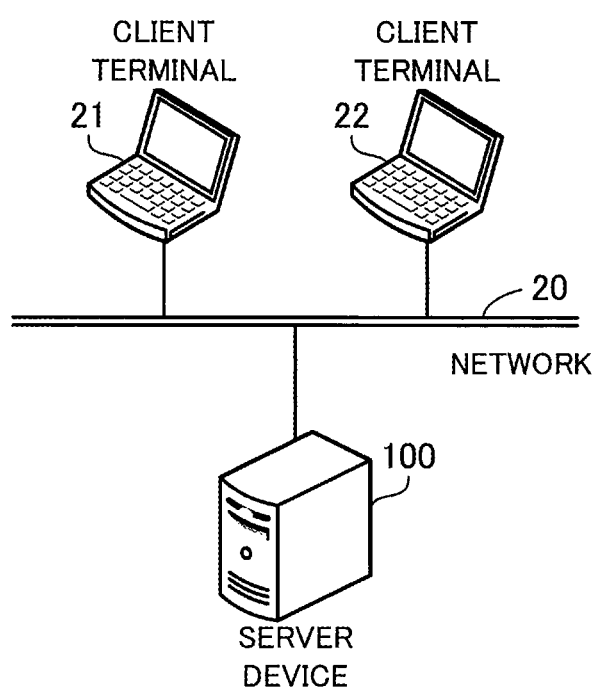
FIG. 2 illustrates an information processing system according to a second embodiment.

A second embodiment is described next. FIG. 2 illustrates an information processing system according to the second embodiment. The information processing system of the second embodiment includes client terminals 21 and 22 and a server device 100. The client terminals 21 and 22 and the server device 100 are individually connected to a network 20. The network 20 may be a local area network (LAN), or a broad area network such as the Internet.

The client terminals 21 and 22 are client computers serving as terminal devices operated by users. The client terminals 21 and 22 individually conduct information processing using data managed by the server device 100. In this regard, each of the client terminals 21 and 22 transmits an access request to the server device 100 via the network 20. The access request may be a read request issued to acquire data or a write request issued to update data.

The server device 100 is a server computer for managing data stored in a non-volatile storage device. The server device 100 is, for example, running a database management system (DBMS). Upon receiving an access request from the client terminal 21 or 22, the server device 100 executes access to data designated by the access request and sends the result back to the requestor having sent the access request. When receiving a read request, the server device 100 reads the designated data and sends the read data back to the requestor. When receiving a write request, the server device 100 updates the designated data and notifies the requestor of the success or failure of the update.

In order to speed up data access, the server device 100 uses high-speed, low-capacity cache memory in addition to the low-speed, high-capacity non-volatile storage device. According to the second embodiment, RAM is employed as the high-speed, low-capacity cache memory, and a HDD is employed as the low-speed, high-capacity non-volatile storage device. Note however that, as the high-speed, low-capacity cache memory, flash memory may be used instead while, as the low-speed, high-capacity non-volatile storage device, a solid state drive (SSD), flash memory, an optical disk, a magneto-optical disk, or a tape may be used instead.

Upon receiving an access request designating data, the server device 100 loads a data group including the designated data from the HDD into the RAM. The data loaded into the RAM is left without being deleted immediately after the execution of the access. Later, upon receiving an access request designating data already loaded into the RAM (cached data), the server device 100 is able to execute the access without loading the data from the HDD into the RAM. Note that the server device 100 is an example of the data arrangement apparatus 10 of the first embodiment.

Figure 3:
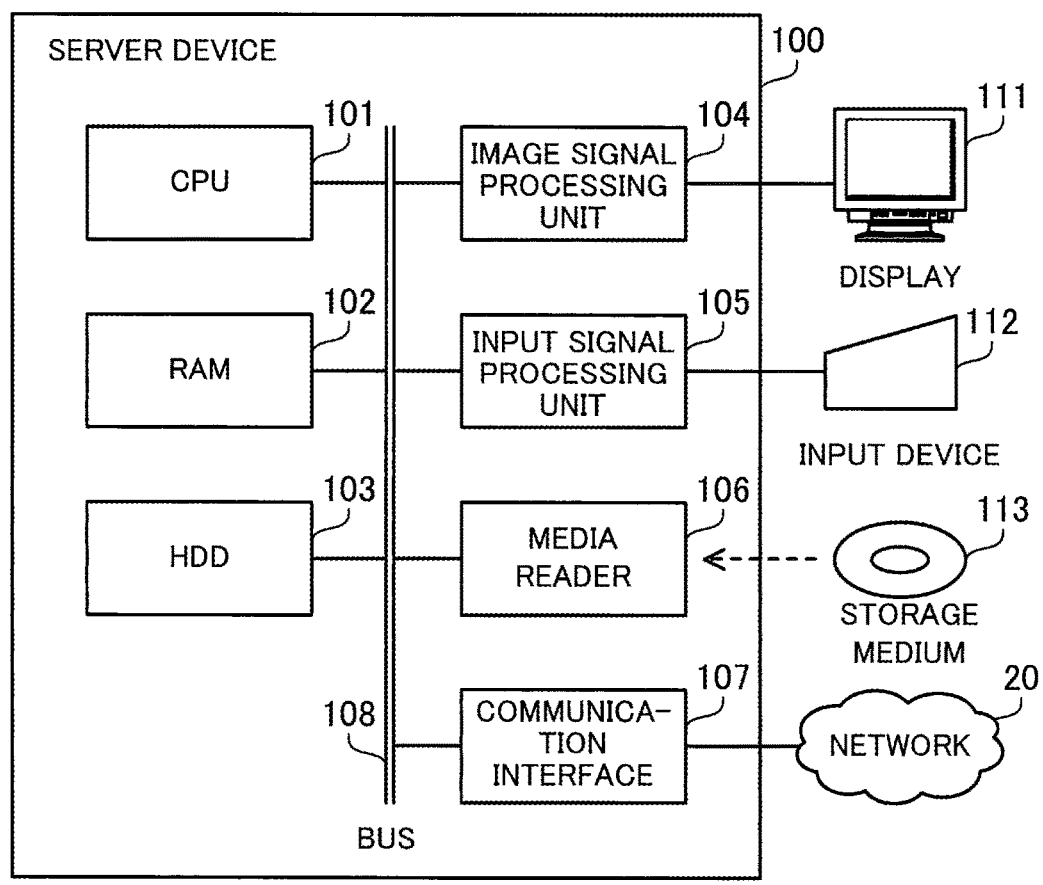
FIG. 3 is a block diagram illustrating an example of hardware of a server device.

FIG. 3 is a block diagram illustrating an example of hardware of the server device. The server device 100 includes a CPU 101, RAM 102, a HDD 103, an image signal processing unit 104, an input signal processing unit 105, a media reader 106, and a communication interface 107. These units are individually connected to a bus 108 in the server device 100. Note that the CPU 101 is an example of the control unit 12 of the first embodiment. The HDD 103 is an example of the storing unit 11 of the first embodiment.

The CPU 101 is a processor including a computing circuit for carrying out program instructions. The CPU 101 loads at least part of a program and data stored in the HDD 103 into the RAM 102 to execute the program. Note that the CPU 101 may include a plurality of processor cores and the server device 100 may include a plurality of processors, and processes to be described later may be executed in parallel using the plurality of processors or processor cores. In addition, a set of a plurality of processors (multiprocessor) may be referred to as the "processor".

The RAM 102 is volatile semiconductor memory for temporarily storing therein programs to be executed by the CPU 101 and data to be used by the CPU 101 for its computation. Note that the server device 100 may be provided with a different type of memory other than RAM, or may be provided with a plurality of memory devices.

The HDD 103 is a non-volatile storage device to store therein software programs, such as an operating system (OS), middleware, and application software, and various types of data. The programs include a data arrangement program for controlling data arrangement in the HDD 103. Note that the server device 100 may be provided with a different type of storage device, such as flash memory or a solid state drive (SDD), or may be provided with a plurality of non-volatile storage devices.

The image signal processing unit 104 outputs an image on a display 111 connected to the server device 100 according to an instruction from the CPU 101. Various types of displays including the following may be used as the display 111: a cathode ray tube (CRT) display; a liquid crystal display (LCD); a plasma display panel (PDP); and an organic electro-luminescence (OEL) display.

The input signal processing unit 105 acquires an input signal from an input device 112 connected to the server device 100 and sends the input signal to the CPU 101. Various types of input devices including the following may be used as the input device 112: a pointing device, such as a mouse, touch panel, touch-pad, or trackball; a keyboard; a remote controller; and a button switch. In addition, the server device 100 may be provided with a plurality of types of input devices.

The media reader 106 is a reader for reading programs and data recorded in a storage medium 113. As the storage medium 113, any of the following may be used: a magnetic disk, such as a flexible disk (FD) or HDD; an optical disk, such as a compact disc (CD) or digital versatile disc (DVD); a magneto-optical disk (MO); and semiconductor memory. The media reader 106 stores programs and data read from the storage medium 113, for example, in the RAM 102 or the HDD 103.

The communication interface 107 is connected to the network 20 and communicates with the client terminals 21 and 22 via the network 20. The communication interface 107 may be a wired communication interface connected via a cable to a communication apparatus, such as a switch, or a wireless communication interface connected via a wireless link to a base station or access point.

Note that the server device 100 may not be provided with the media reader 106, and further may not be provided with the image signal processing unit 104 and the input signal processing unit 105 in the case where these units are controllable from a terminal operated by a user. In addition, the display 111 and the input device 112 may be integrally provided on the chassis of the server device 100. The client terminals 21 and 22 may individually have the same hardware configuration as the server device 100.

Figure 4:
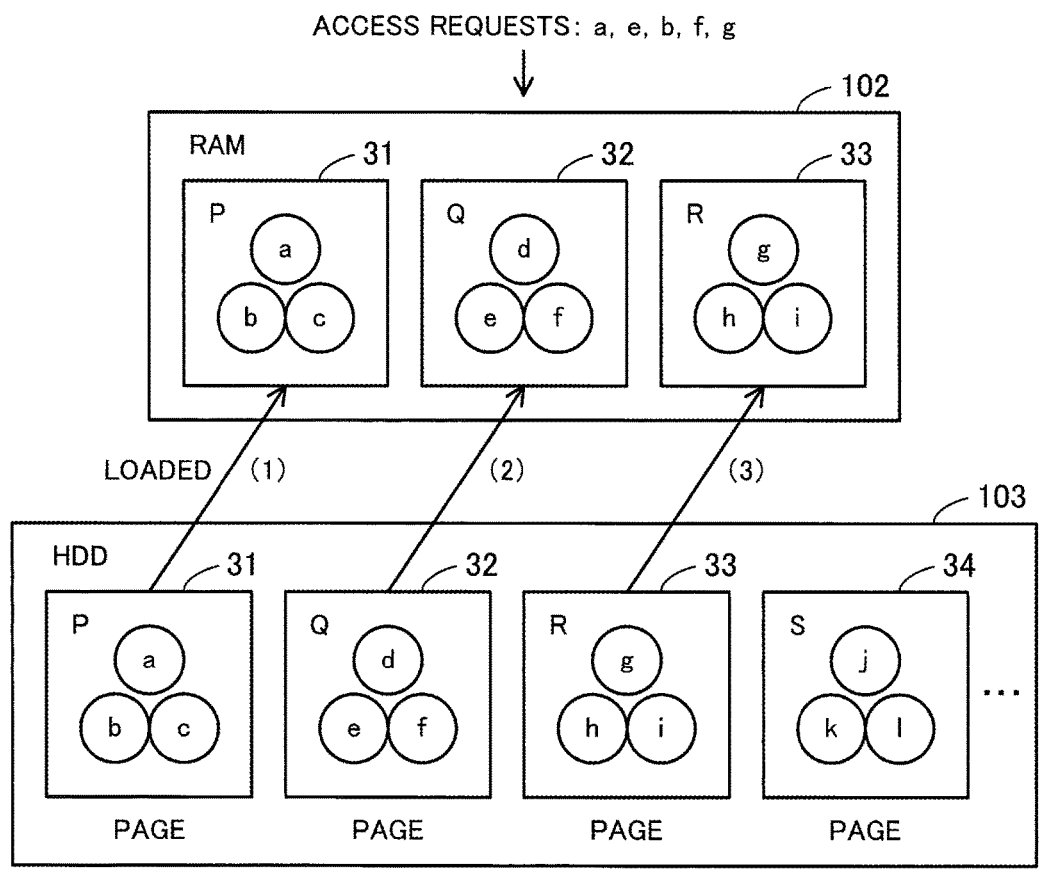
FIG. 4 illustrates an example of loading pages into cache memory.

Next described are data caching and data arrangement on the HDD 103. FIG. 4 illustrates an example of loading pages into cache memory. The server device 100 divides the storage area of the HDD 103 into a plurality of pages, and reads and writes data to and from the HDD 103 on a page-by-page basis. One page represents one continuous physical storage area. A page is sometimes called a segment. Pages may be either the same in size or different. One page is able to hold a plurality of unit data pieces. When the server device 100 is running a relational database management system (RDBMS), one unit data piece corresponds to, for example, one tuple in a table. Each unit data piece is identifiable by, for example, a primary key or a serial number other than the primary key.

As an example, the HDD 103 includes a page 31 (page P), a page 32 (page Q), a page 33 (page R), and a page 34 (page S). The page 31 includes data a, b, and c as unit data pieces. Similarly, the page 32 includes data d, e, and f; the page 33 includes data g, h, and i; and the page 34 includes data j, k, and l. Data read and write to and from the HDD 103 are performed on a page-by-page basis. Therefore, in the following description, reading or writing all the unit data pieces belonging to one page is sometimes simply referred to as "reading or writing the data of the page". Assume that there is an upper limit to the number of unit data pieces held in one page.

Under such conditions, upon receiving an access request, the server device 100 searches for a page including a unit data piece designated by the received access request, and loads the data of the page found by the search from the HDD 103 into the RAM 102. Then, the server device 100 executes access indicated by the access request to the data in the RAM 102. In the case where the access request is a read request, the server device 100 provides the unit data piece loaded into the RAM 102. In the case where the access request is a write request, the server device 100 updates the unit data piece loaded into the RAM 102. The data loaded into the RAM 102 is not discarded immediately and used as a cache of the HDD 103. If an access request received from this point forward designates a unit data piece included in the cached page, the server device 100 is able to use the data in the RAM 102, skipping reading it from the HDD 103.

Assume for example that the server device 100 has sequentially received access requests individually designating data a, e, b, f, and g. First, in response to the access request designating the data a, the server device 100 loads the data of the page 31 holding the data a therein (i.e., the entire page 31 including the data a, b, and c) into the RAM 102. Next, in response to the access request designating the data e, the server device 100 loads the data of the page 32 holding the data e therein (i.e., the entire page 32 including the data d, e, and f) into the RAM 102. Then, in response to the access request designating the data b, the server device 100 skips read access to the HDD 103 because the page 31 holding the data b therein is being cached in the RAM 102 and, therefore, uses the data b present in the RAM 102. Next, in response to the access request designating the data f, the server device 100 skips read access to the HDD 103 because the page 32 holding the data f therein is being cached in the RAM 102 and, therefore, uses the data f present in the RAM 102. Then, in response to the access request designating the data g, the server device 100 loads the data of the page 33 holding the data g therein (i.e., the entire page 33 including the data g, h, and i) into the RAM 102.

Figure 5:
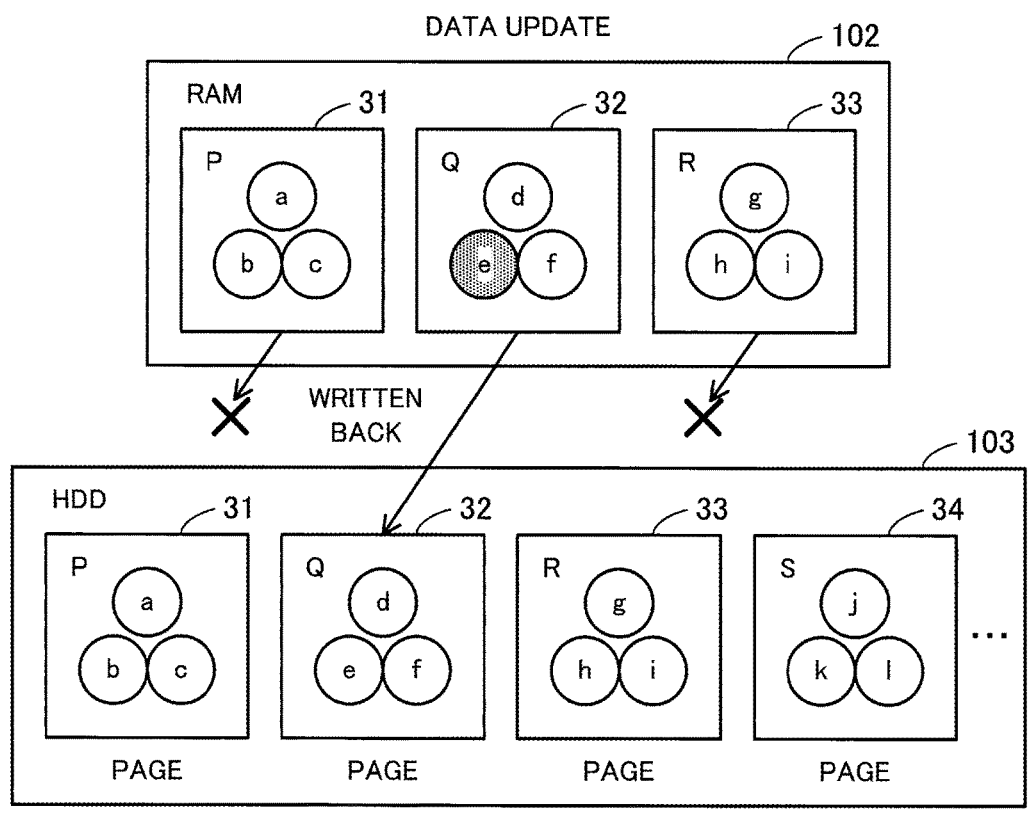
FIG. 5 illustrates an example of a write-back operation of a page having undergone an update.

FIG. 5 illustrates an example of a write-back operation of a page having undergone an update. The storage area of the RAM 102 available to be used as cache memory (cache area) is small compared to the storage area of the HDD 103 with data stored therein. Therefore, when the cache area of the RAM 102 runs short, it is needed to remove the data of a page from the RAM 102. Assume for example that, in the case where data of the page 34 is desired to be loaded into the RAM 102, the pages 31 to 33 are being cached and the cache area is insufficient. In this case, the server device 100 may remove the data of at least one of the pages 31 to 33 from the RAM 102 to create free space in the cache area.

In this regard, as for a page not including an updated unit data piece, the server device 100 need not write the data of the page back to the HDD 103 and is allowed to simply discard the data from the RAM 102. On the other hand, as for a page including an updated unit data piece, the server device 100 needs to write the data of the page back to the HDD 103 (write-back operation). Assume for example that, amongst the data a, b, c, d, e, f, g, h, and i, only the data e has been updated in response to an access request. The update of the data e is not immediately reflected in the HDD 103 so as to reduce the number of writes to the HDD 103. In this case, to remove the data of the page 31 from the RAM 102, the server device 100 simply discards the data of the page 31. Discarding data from the RAM 102 may be achieved by not only explicit erase processing but also overwriting a storage area storing the data to be discarded with other data. In like fashion, to remove the data of the page 33 from the RAM 102, the server device 100 simply discards the data of the page 33.

On the other hand, before removing the data of the page 32 from the RAM 102, the server device 100 writes the data of the page 32 (the entire page 32 including the data d, e, and f) back to the HDD 103 in order to reflect the update of the data e in the HDD 103. Note however that reflecting, in the HDD 103, the data update in the RAM 102 may not be limited to the time when the data being cached is removed from the RAM 102. For example, the server device 100 may periodically check each page including an updated unit data piece and perform a write-back operation.

Note that when the data of a page is being cached in the RAM 102, a read of the data from the HDD 103 in response to an access request designating a unit data piece belonging to the page is skipped. In order to improve the data access performance using a low-capacity cache area, it is preferable to arrange, on the same page, unit data pieces likely to be successively accessed. In view of this, the server device 100 is configured to record the history of an access sequence among unit data pieces, and dynamically change data arrangement (which unit data piece to reside on which page) in the HDD 103 based on the history.

Figure 6:
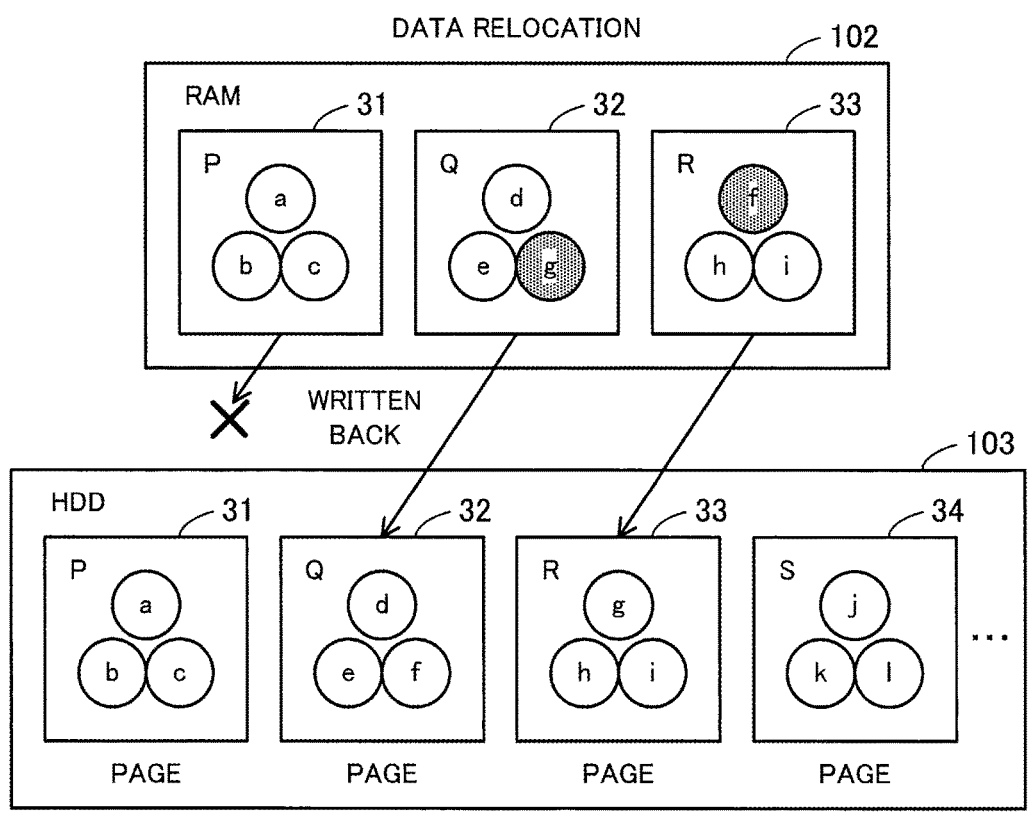
FIG. 6 illustrates an example of write-back operations of pages having undergone data relocation.

FIG. 6 illustrates an example of write-back operations of pages having undergone a data relocation. Assume, as an example, that the server device 100 receives, from the client terminal 21, an access request designating the data e and receives, immediately afterwards, an access request designating the data g. However, at present, the data e belongs to the page 32 while the data g belongs to the page 33. Therefore, at the time when the access request designating the data g is received, the data of the page 33 is not being cached (occurrence of a cache miss), and read access to the HDD 103 may occur. In the case where access to the data e and g in the stated sequence is likely to take place again in the future, the data e and g preferably belong to the same page.

In view of this, it may be considered appropriate for the server device 100 to make relocation between the page 32 holding the data e and the page 33 holding the data g in such a manner that the data e and g belong to the same page. For example, the server device 100 switches around the data f and the data g. As a result, the page 32 includes the data d, e, and g, and the page 33 includes the data f, h, and i. Herewith, when access to the data e and g in the stated sequence takes place again in the future, the data of the page 32 including the data g is cached in the RAM 102 at the time of the access to the data e, and read access to the HDD 103 does not occur in principle at the time of the access to the data g.

A data relocation between pages is carried out while the data of two pages subject to the relocation is being cached in the RAM 102. The data relocation made in the RAM 102 is later reflected in the HDD 103. For example, after a data relocation between the pages 32 and 33 is carried out, the data of the pages 32 and 33 being cached does not match that of the pages 32 and 33 stored in the HDD 103. Therefore, the server device 100 needs to write the data of the pages 32 and 33 back to the HDD 103 from the RAM 102. The data write-back operations of the pages having undergone the relocation may be performed when the data of the pages is removed from the RAM 102, as in the case of the above-described write-back operation associated with a data update. Note however that the server device 100 may periodically check each page having undergone a data relocation and perform a write-back operation.

Next examined is the cost of writing data being cached in the RAM 102 back to the HDD 103 in consideration of both the data update of FIG. 5 and the data relocation of FIG. 6. Assume that data of the pages 31, 32, and 33 is cached in the RAM 102, and the data of all the pages 31, 32, and 33 is later removed from the RAM 102. Then also assume that, while the data being cached, only the data e amongst the unit data pieces included in the pages 31, 32, and 33 is updated. In the case of not carrying out the data relocation between the pages 32 and 33, the entire page 32 including the updated data e amongst the pages 31, 32, and 33 is written back to the HDD 103, as illustrated in FIG. 5. On the other hand, in the case of carrying out the data relocation between the pages 32 and 33, the entire pages 32 and 33 amongst the pages 31, 32, and 33 are written back to the HDD 103. While the writing-back of the page 32 is performed regardless of whether the data relocation has been carried out, the writing-back of the page 33 is performed only when the data relocation has been carried out. That is, according to this example, carrying out the data relocation increases the amount of data writing to the HDD 103 by one page. The increased amount of data writing is seen as the cost of the data relocation.

On the other hand, the property of one particular unit data piece and another particular unit data piece being likely to be successively accessed (locality) does not always last forever and may change. Assume for example that, after the above-described data relocation is carried out due to the high likelihood of the data e and g being successively accessed, the locality changes and, then, the likelihood increases that the data d and f will be successively accessed. In this regard, because the data d and f individually belong to different pages at the moment, the server device 100 carries out another data relocation between the pages 32 and 33. Thus, in view of the possibility of the locality being changed, the benefit of an improvement in the access performance achieved by a data relocation is evaluated to a finite value. Therefore, the effect of a single data relocation is quantitatively evaluated by subtracting the cost from the benefit.

Figure 7:
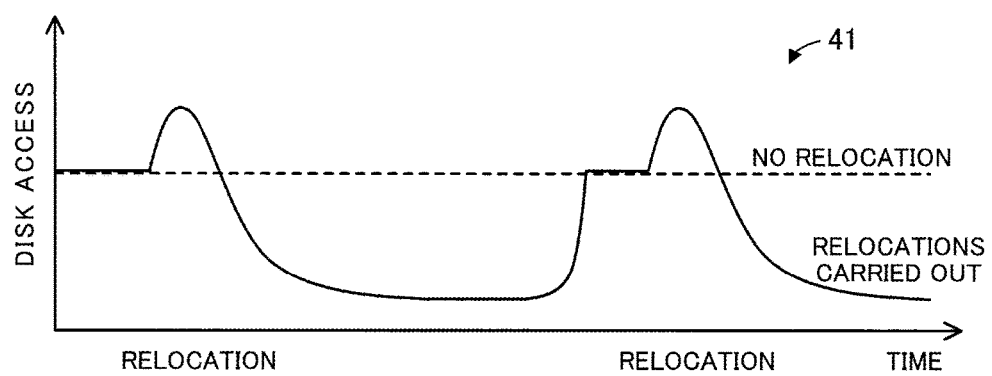
FIG. 7 is a graph illustrating an example of changes in disk cost associated with data relocations.

FIG. 7 is a graph illustrating an example of changes in disk cost associated with data relocations. Here, the amount of disk access is examined which is obtained by adding the amount of data read from the HDD 103 to the RAM 102 and the amount of data written back from the RAM 102 to the HDD 103. As illustrated in a graph 41, in the case where the server device 100 carries out no data relocation, cache misses occur randomly and data read access to the HDD 103 is performed at a constant rate. On the other hand, the amount of data write access to the HDD 103 does not increase because no data relocation is carried out. Therefore, the disk cost in the case of no data relocation is stable at a certain level.

On the other hand, in the case where the server device 100 carries out data relocations, the amount of data write access to the HDD 103 temporarily increases in association with a data relocation, as illustrate in the graph 41. Subsequently, once the data relocation is reflected in the HDD 103, cache misses decrease and data read access to the HDD 103 is reduced. Thus, the amount of disk access in the case of carrying out a data relocation decreases significantly after a temporal increase. Then, when the locality has changed, the effect of the data relocation gradually fades away and the amount of disk access returns to the same level as in the case of no data relocation. Once the server device 100 carries out a data relocation according to the changed locality, the amount of disk access again decreases significantly after a temporal increase. Carrying out appropriate data relocations enables an integrated value of the amount of disk access in the case of carrying out the data relocations to be smaller than that of the amount of disk access in the case of carrying out no data relocation. That is, the server device 100 actively carrying out data relocations decreases the amount of disk access, holding the promise of improving the data access performance.

Next described is handling of a plurality of data relocation plans. When being in operation and enabling data access from the client terminals 21 and 22, the server device 100 sequentially detects pairs of unit data pieces successively accessed. As a result, data relocation plans each for transferring a unit data piece from one page to another are sequentially generated. When a plurality of data relocation plans are generated, it may be considered appropriate for the server device 100 to sequentially process the data relocation plans. Specifically, by the sequential method, the server device 100 evaluates a first data relocation plan on the premise of the current data arrangement in the HDD 103, and then determines whether to execute the first data relocation plan. When determining to execute the data relocation plan, the server device 100 transfers a unit data piece from one page to another according to the first data relocation plan. Subsequently, the server device 100 evaluates a second data relocation plan on the premise of the latest data arrangement obtained as a result of executing the first data relocation plan, and then determines whether to execute the second data relocation plan. Thus, the server device 100 is able to sequentially evaluate and execute a plurality of data relocation plans.

On the other hand, it may be considered appropriate for the server device 100 to evaluate and execute a plurality of data relocation plans in parallel. Specifically, by the parallel method, the server device 100 evaluates each of the plurality of data relocation plans on the premise of the current data arrangement in the HDD 103, and selects one or more data relocation plans to be executed amongst the generated and evaluated data relocation plans. The server device 100 executes the selected data relocation plans in any order. However, the parallel method may suffer from the occurrence of interference between/among a plurality of data relocations, as described below, and what remains an issue is how to take account of such interference.

Figure 8:
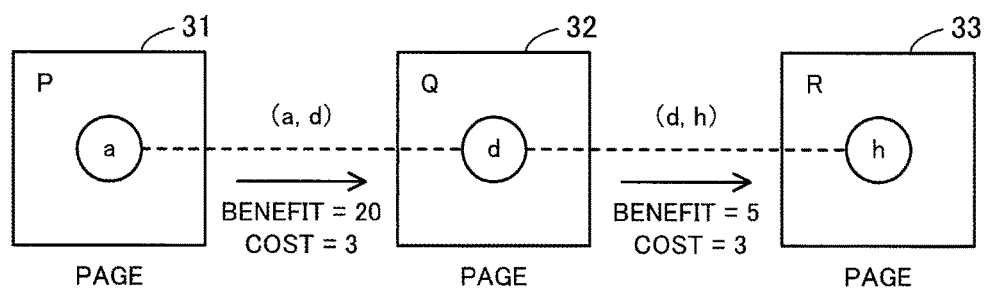
FIG. 8 illustrates an example of interference between/among a plurality of data relocations.

FIG. 8 illustrates an example of interference between/among a plurality of data relocations. As described above, the data a is included in the page 31; the data d is included in the page 32; and the data h is included in the page 33. Assume here that a data relocation plan #1 for transferring the data a from the page 31 to the page 32 is generated following successive access to the data a and d. In addition, separately from the data relocation plan #1, a data relocation plan #2 for transferring the data d from the page 32 to the page 33 is generated following successive access to the data d and h. Assume that the data relocation plan #1 has a benefit of "20" and a cost of "3". In this case, the evaluation value of the data relocation plan #1 is calculated as: 20−3=17. Based only on the evaluation value of the data relocation plan #1, the server device 100 determines to execute the data relocation plan #1. Assume also that the data relocation plan #2 has a benefit of "5" and a cost of "3". In this case, the evaluation value of the data relocation plan #2 is calculated as: 5−3=2. Based only on the evaluation value of the data relocation plan #2, the server device 100 determines to execute the data relocation plan #2.

However, executing both the data relocation plans #1 and #2 results in the data a residing on the page 32 and the data d and h residing on the page 33. Because the data a and d are separated on the different pages despite the execution of the data relocation plan #1, the benefit of the data relocation plan #1, "20", is not achieved. As a result, the real evaluation value for the combination of the data relocation plans #1 and #2 is calculated as: 5−(3+3)=−1. In the case of this example, the highest overall evaluation is obtained when only the data relocation plan #1 is executed.

As just described, "additivity" is not always observed in the evaluation values of a plurality of data relocation plans. Even if each of the data relocation plans is evaluated and, then, data relocation plans with a high evaluation value are selected and executed, the effect of improving the access performance expected from the individual evaluation values may not be obtained due to "interference" between/among a plurality of data relocation plans. That is, the sum of the evaluation values of the data relocation plans to be executed is inconsistent with the effect of improving the access performance. The degree of interference is difficult to predict based only on the evaluation values of individual data relocation plans because it varies according to the arrangement of unit data pieces and the like.

To manage this problem, it may be considered appropriate to identify final data arrangements obtained by combining a plurality of data relocation plans and directly calculate an evaluation value for each of the combinations. However, this method entails evaluation of a maximum of $2^N$ combinations if there are N data relocation plans (N is a natural number), which puts undue load on the server device 100. In view of the above-described problems, the server device 100 of the second embodiment facilitates efficient searching for a combination of data relocation plans having a potent effect on improving the access performance in consideration of possible interference caused between/among a plurality of data relocation plans.

Figure 9A:
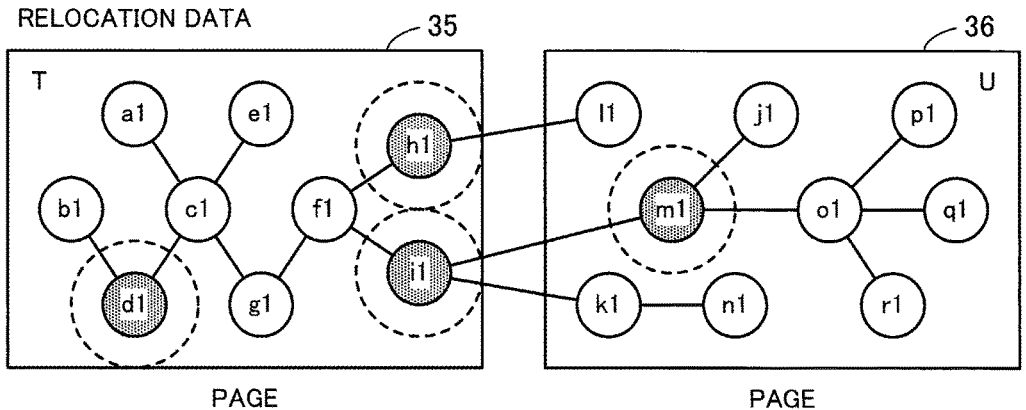
FIGS. 9A, 9B, and 9C illustrate examples of an influence range of a data relocation.
Figure 9B:
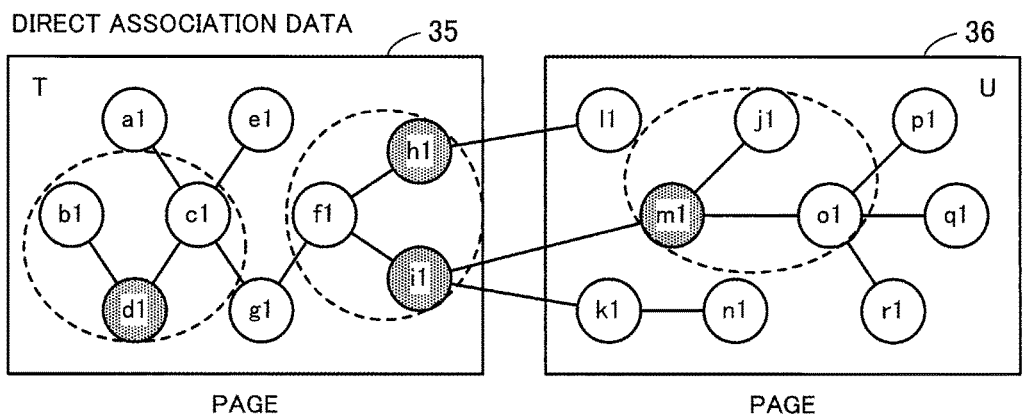
Figure 9C:
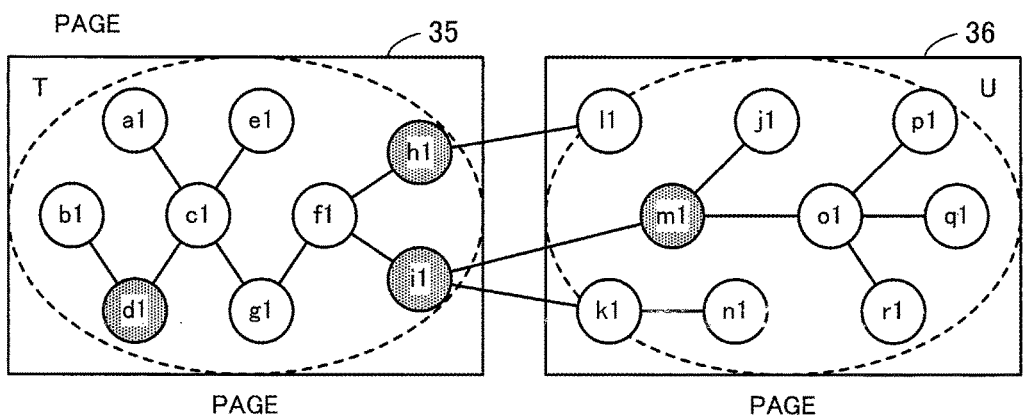

FIGS. 9A, 9B, and 9C illustrate examples of an influence range of a data relocation. In searching for a combination of data relocation plans, the server device 100 employs influence range levels each with a different assumed size of influence range. The server device 100 does not specifically calculate the range of unit data pieces on which each data relocation plan has an influence, and relies on the assumption that each data relocation plan has an influence on only unit data pieces within the range indicated by each influence range level.

Under this assumption, in the case where the influence range of one data relocation plan overlaps that of another data relocation plan (i.e., in the case where there is a unit data piece included in both the influence ranges), the server device 100 determines that there is a significant risk of causing interference and, therefore, does not adopt at least one of the two data relocation plans. Which one of the data relocation plans to be adopted may be determined based on the evaluation values calculated for the individual data relocation plans. On the other hand, in the case where the influence range of one data relocation plan does not overlap that of another data relocation plan, the server device 100 determines that there is a low risk of causing interference and is, therefore, able to adopt both the data relocation plans.

Note however that each influence range level represents an assumed size of its influence range, and interference may occur in reality even between data relocation plans selected in such a manner that their influence ranges do not overlap one another. In view of this, the server device 100 uses a coefficient called "interference rate". The server device 100 uses a value, obtained by multiplying the sum of the evaluation values of the adopted data relocation plans by the interference rate, as an index value indicating the effect induced by the combination of the data relocation plans.

The interference rate is a parameter indicating the degree of occurrence of interference between/among data relocation plans whose influence ranges do not overlap one another, and depends on an adopted influence range level and the operational environment of the server device 100. As the influence range indicated by an influence range level is smaller, the interference rate takes a lower value because interference tends to occur and it is, therefore, difficult to obtain an effect indicated by the evaluation values. On the other hand, as the influence range indicated by an influence range level is larger, the interference rate takes a higher value because interference is less likely to occur and it is, therefore, easy to obtain an effect indicated by the evaluation values. As described later, the interference rate is updated according to the status of access to unit data pieces.

Note here that the server device 100 attempts to search for a combination of data relocation plans not at one influence range level only but at a plurality of individual influence range levels. Two or more combinations generated at different influence range levels are compared based on their index values each calculated by using the above-described interference rate assigned to the corresponding influence range level. In this manner, the server device 100 is able to determine whether it is beneficial to select and execute a number of data relocation plans even if interference occurs or to execute a fewer selected data relocation plans so as to avoid interference. Which one of the former and latter methods being beneficial depends on the interference rates.

The second embodiment considers the following three influence range levels: (A) "relocation data level" whose influence range includes only unit data pieces to be transferred; (B) "direct association data level" whose influence range includes not only the unit data pieces to be transferred but also unit data pieces each directly associated with one or more of the unit data pieces to be transferred and belonging to the same page as its directly associated unit data piece/s to be transferred; and (C) "page level" whose influence range includes all unit data pieces belonging to pages, on each of which one or more of the unit data pieces to be transferred reside. The term "association" between one unit data piece and another means that access has been successively made to these two unit data pieces.

Specific examples of three influence range levels are described next using pages 35 and 36 as illustrated in FIGS. 9A, 9B, and 9C. The page 35 (page T) includes nine unit data pieces of data a1, b1, c1, d1, e1, f1, g1, h1, and i1. The page 36 (page U) includes nine unit data pieces of data j1, k1, l1, m1, n1, o1, p1, q1, and r1. The data a1 is associated with the data c1. The data b1 is associated with the data d1. The data c1 is associated with each of the data a1, d1, e1, and g1. The data d1 is associated with each of the data b1 and c1. The data e1 is associated with the data c1. The data f1 is associated with each of the data g1, h1, and i1. The data h1 is associated with each of the data f1 and l1. The data i1 is associated with each of the data f1, k1, and m1. The data j1 is associated with the data m1. The data k1 is associated with each of the data i1 and n1. The data l1 is associated with the data h1. The data m1 is associated with each of the data i1, j1, and o1. The data n1 is associated with the data k1. The data o1 is associated with each of the data m1, p1, q1, and r1. The data p1 is associated with the data o1. The data q1 is associated with the data o1. The data r1 is associated with the data o1. There is no association other than those above.

Then, assume that one data relocation plan involving the pages 35 and 36 and transferring the data d1, h1, i1, and m1 is generated. If the "relocation data level" is adopted as the influence range level, the influence range of the data relocation plan includes the data d1, h1, i1, and m1 to be transferred and does not include any other unit data pieces. If the "direct association data level" is adopted as the influence range level, the influence range of the data relocation plan includes the data d1, h1, i1, and m1 to be transferred, and also includes the data b1 and c1 associated with the data d1, the data f1 associated with the data h1 and i1, and the data j1 and o1 associated with the data m1. Note, however, that although the data k1 is associated with the data i1 and the data l1 is associated with the data h1, the data k1 and l1 reside on different pages from the data h1 and i1, respectively. As a result, the data k1 and l1 are not included in the influence range. If the "page level" is adopted as the influence range level, the influence range of the data relocation plan includes all the unit data pieces belonging to the respective pages 35 and 36.

A different data relocation plan allowed to be combined with the data relocation plan in question has an influence range not overlapping the above-described influence range (i.e., not including the unit data pieces included in the above-described influence range). The server device 100 solves the independent set problem using a graph to thereby detect, amongst a plurality of data relocation plans, one or more data relocation plans whose influence ranges do not overlap one another.

Figure 10:
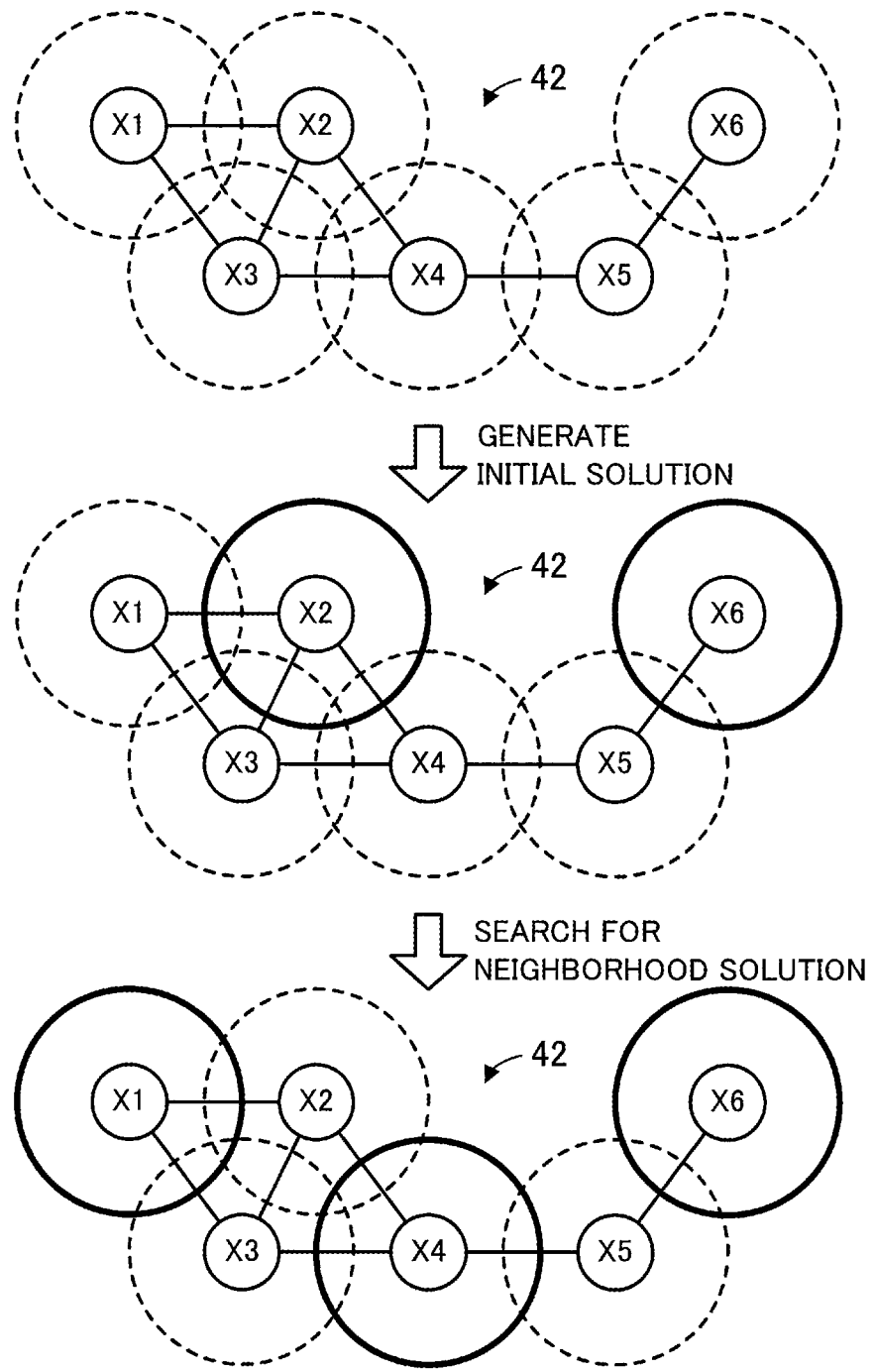
FIG. 10 illustrates an example of selecting data relocation plans using a graph.

FIG. 10 illustrates an example of selecting data relocation plans using a graph. After selecting one influence range level, the server device 100 identifies unit data pieces included in the influence range of each of a plurality of data relocation plans according to the selected influence range level. The server device 100 searches for unit data pieces included in the influence ranges of two or more data relocation plans, to thereby detect data relocation plans whose influence ranges overlap one another. Then, the server device 100 generates an overlap graph with nodes representing data relocation plans and edges representing overlaps between influence ranges. In the overlap graph, an edge is established between two nodes corresponding to two data relocation plans whose influence ranges overlap one another. On the other hand, no edge is present between two nodes corresponding to two data relocation plans whose influence ranges do not overlap one another.

As an example, the server device 100 generates an overlap graph 42. The overlap graph 42 includes nodes representing data relocation plans X1, X2, X3, X4, X5, and X6. The influence ranges of the following pairs of data relocation plans overlap one another: X1 and X2; X1 and X3; X2 and X3; X2 and X4; X3 and X4; X4 and X5; and X5 and X6. As for pairs of data relocation plans other than those above, their influence ranges do not overlap one another. As a result, the overlap graph 42 includes seven edges indicating these overlaps.

Using the generated overlap graph, the server device 100 searches for combinations of data relocation plans whose influence ranges do not overlap. Combinations of data relocation plans whose influence ranges do not overlap are represented in the overlap graph as sets of non-adjacent nodes not lying side by side with each other (i.e., nodes not connected by edges). First, the server device 100 randomly selects a set of non-adjacent nodes, to thereby generate an initial solution of a combination of data relocation plans. For example, the server device 100 generates a combination of the data relocation plans X2 and X6 as the initial solution.

Then, the server device 100 starts with the generated initial solution and searches for neighborhood solutions using local search. A neighboring solution is generated by eliminating a data relocation plan from the current solution and instead adopting one or more data relocation plans not included in the current solution. Note however that each neighborhood solution satisfies the constraint that the influence ranges of individual data relocation plans included in the solution do not overlap one another.

If the sum of the evaluation values associated with the neighborhood solution is larger than that of the current solution, the server device 100 adopts the neighborhood solution as a favorable solution, and further searches for a neighborhood solution based on the adopted favorable solution. For example, the server device 100 excludes the data relocation plan X2, and instead adopts the data relocation plans X1 and X4. Herewith, a neighborhood solution with a combination of the data relocation plans X1, X4, and X6 is generated. If the sum of the evaluation values of the data relocation plans X1, X4, and X6 is larger than the sum of the evaluation values of the data relocation plans X2 and X6, the server device 100 adopts, as a favorable solution, the neighborhood solution in place of the initial solution. The server device 100 repeats the above-described process until a predetermined condition for stopping the process (for example, a condition on the number of searches, or a condition on the evaluation values) is satisfied, to thereby find an optimal solution or a suboptimal solution close to the optimal solution.

Figure 11:
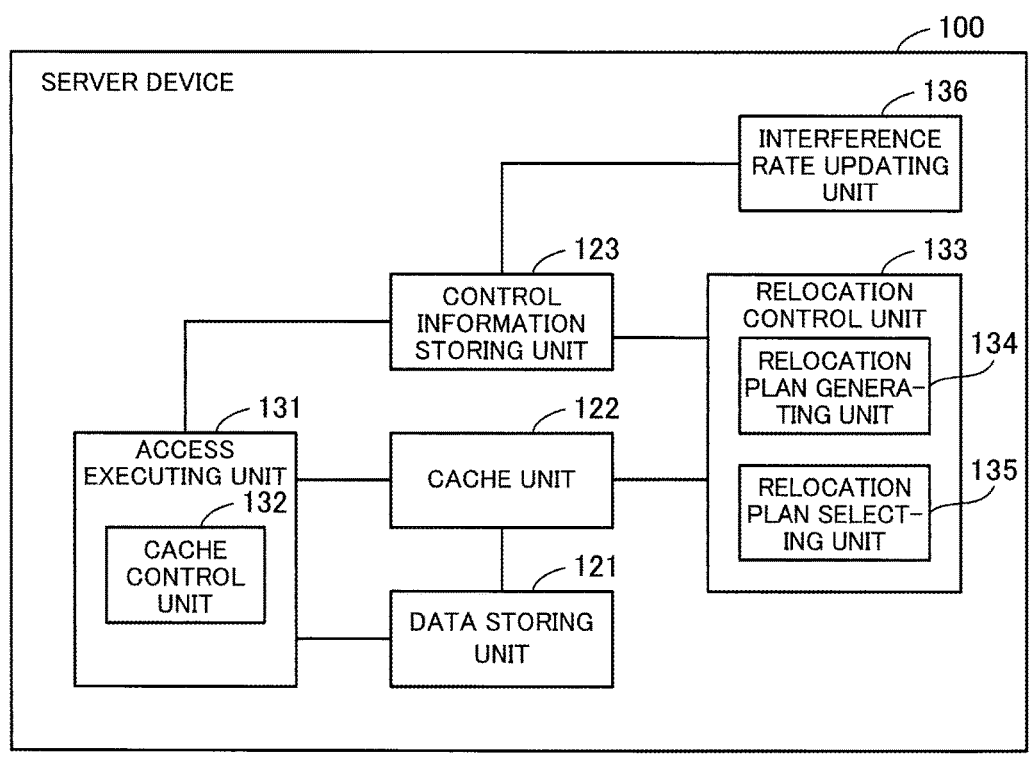
FIG. 11 is a block diagram illustrating an example of functions of the server device.

Next described are data relocation functions of the server device 100. FIG. 11 is a block diagram illustrating an example of functions of the server device. The server device 100 includes a data storing unit 121, a cache unit 122, a control information storing unit 123, an access executing unit 131, a relocation control unit 133, and an interference rate updating unit 136. The data storing unit 121 may be implemented as a storage area secured in the HDD 103. Each of the cache unit 122 and the control information storing unit 123 may be implemented as a storage area secured in the RAM 102. The access executing unit 131, the relocation control unit 133, and the interference rate updating unit 136 may be implemented, for example, as modules of a program executed by the CPU 101.

The data storing unit 121 includes a plurality of pages each of which is a continuous physical storage area and is able to store one or more unit data pieces. A unit data piece is a unit of data identified by identification information and accessed in response to an access request, and corresponds to, for example, one tuple in a table. Data read and write to and from the data storing unit 121 are performed by the access executing unit 131 on a page-by-page basis.

The cache unit 122 functions as cache memory for the data storing unit 121. The storage capacity of the cache unit 122 is smaller than that of the data storing unit 121, but the access speed of the cache unit 122 (especially, the random access speed) is higher than that of the data storing unit 121. Data of some pages out of a plurality of pages included in the data storing unit 121 is loaded into the cache unit 122 on a page-by-page basis. Data updates and data relocations according to access requests are performed on the data loaded into the cache unit 122 and, then, reflected in the data storing unit 121 when the data is removed from the cache unit 122.

The control information storing unit 123 stores therein control information used for control of data access, cache management, and data relocations. The control information includes search information indicating mappings between pages and unit data pieces and history information indicating pairs of unit data pieces accessed successively. The control information also includes parameter information indicating parameters to be used to calculate the benefit and cost of a data relocation and interference rates for individual influence range levels. Details of the control information are described later.

The access executing unit 131 receives an access request, and executes access to data being cached in the cache unit 122 according to the received access request. When receiving a read request, the access executing unit 131 acquires, from the cache unit 122, a unit data piece designated by the read request and returns the acquired unit data piece. When receiving a write request, the access executing unit 131 updates a unit data piece in the cache unit 122 using data included in the write request and returns information indicating the success or failure of the update. In addition, according to a received access request, the access executing unit 131 updates the history information or the like stored in the control information storing unit 123.

The access executing unit 131 includes a cache control unit 132. The cache control unit 132 controls data loading from the data storing unit 121 to the cache unit 122. Upon receiving an access request designating an uncached unit data piece, the cache control unit 132 loads the entire data of a page including the unit data piece from the data storing unit 121 into the cache unit 122. In loading the data, if there is insufficient free space in the cache unit 122, the cache control unit 132 removes the data of a page being cached from the cache unit 122. If the data of the page to be removed has been updated or relocated within the cache unit 122, the cache control unit 132 writes the entire data of the page to be removed back to the data storing unit 121 from the cache unit 122.

The relocation control unit 133 analyzes the history information stored in the control information storing unit 123, and carries out a data relocation on pages being cached in the cache unit 122. The relocation control unit 133 includes a relocation plan generating unit 134 and a relocation plan selecting unit 135. Once a predetermined start condition is met, the relocation plan generating unit 134 generates relocation plans based on the current mappings between pages and unit data pieces and pairs of unit data pieces successively accessed over recent periods. The start condition is determined in advance on the basis, for example, of the length of time elapsed since a data relocation was examined last time or the amount of the history information accumulated. Each data relocation plan is expressed using, for example, identification information of two relocation-target pages and identification information of unit data pieces to be transferred between the two pages. The relocation plan generating unit 134 examines transfer of unit data pieces between two pages in such a manner that unit data pieces successively accessed belong to the same page as much as possible.

Using the parameter information stored in the control information storing unit 123, the relocation plan selecting unit 135 calculates an evaluation value for each data relocation plan generated by the relocation plan generating unit 134 by quantitatively evaluating the benefit and cost of adopting the data relocation plan. The benefit is calculated in consideration of, for example, the degree of improvement of the situation in which unit data pieces successively accessed reside on different pages; expected values each for the number of times a pair of unit data pieces being successively accessed from this point forward; and the reading speed of the HDD 103. On the other hand, the cost is calculated in consideration of, for example, the amount of increase in pages to be written back to the data storing unit 121 and the writing speed of the HDD 103. Details of the benefit and cost are described later. Based on the evaluation values, the relocation plan selecting unit 135 selects one or more data relocation plans to be executed amongst a plurality of data relocation plans generated by the relocation plan generating unit 134.

The interference rate updating unit 136 monitors the data access performance for a predetermined amount of time after the relocation control unit 133 carries out a data relocation. As an index indicating the data access performance, for example, the number of cache misses, i.e., the number of times a requested unit data piece has not been loaded into the cache unit 122, may be used. Then, when the predetermined amount of time elapses after the data relocation, the interference rate updating unit 136 updates a corresponding interference rate stored in the control information storing unit 123 in such a manner as to reflect the data access performance after the data relocation. For example, the interference rate updating unit 136 updates the interference rate using the ratio of the evaluation value associated with the executed data relocation to the number of cache misses. This allows an evaluation value to be corrected using the updated interference rate in the next examination of data relocation plans. Herewith, it is possible to determine with higher accuracy whether the access performance after the data relocation is favorable.

FIG. 12 illustrates an example of a search table and a reverse search table. A search table 141 is stored in the control information storing unit 123. The search table 141 includes columns of data identifier (ID) and page identifier. Each field in the data identifier column contains the identification information for identifying a unit data piece. As data identifiers, primary keys of the table or serial numbers automatically assigned by the DBMS may be used. Each field in the page identifier column contains the identification information for identifying a page. As page identifiers, addresses on the HDD 103 may be used. In the search table 141, one data identifier is associated with one page identifier. This means that a unit data piece with the data identifier belongs to a page with the page identifier. With reference to the search table 141, the data identifier of a unit data piece allows finding the page identifier of a page to which the unit data piece belongs.

A reverse search table 142 is stored in the control information storing unit 123. The reverse search table 142 includes columns of the following items: page identifier; data identifier; update flag; and relocation flag. Each field in the update flag column contains the update flag indicating whether one or more unit data pieces updated in the cache unit 122 are present among unit data pieces belonging to the corresponding page. The update flag set to 1 indicates that one or more updated unit data pieces are present and the update has yet to be reflected in the data storing unit 121. The update flag set to 0 indicates that there is no updated unit data piece. Each field in the relocation flag column contains the relocation flag indicating whether the corresponding page in the cache unit 122 has been subject to a data relocation. The relocation flag set to 1 indicates that the page has been subject to a data relocation and the data relocation has yet to be reflected in the data storing unit 121. The relocation flag set to 0 indicates that the page has not been subject to a data relocation.

In the reverse search table 142, one page identifier is associated with none or one or more data identifiers, one update flag, and one relocation flag. With reference to the reverse search table 142, data identifiers of all the unit data pieces belonging to a page are found based on the page identifier of the page. Further, with reference to the reverse search table 142, the update flag and relocation flag corresponding to a page are found based on the page identifier of the page.

As for data relocations in the cache unit 122, unit data pieces may be transferred within the RAM 102 to change storage locations of the unit data pieces. Alternatively, only updates of the search table 141 and the reverse search table 142 may be made while the storage locations of the unit data pieces in the RAM 102 are unchanged.

Figure 13:
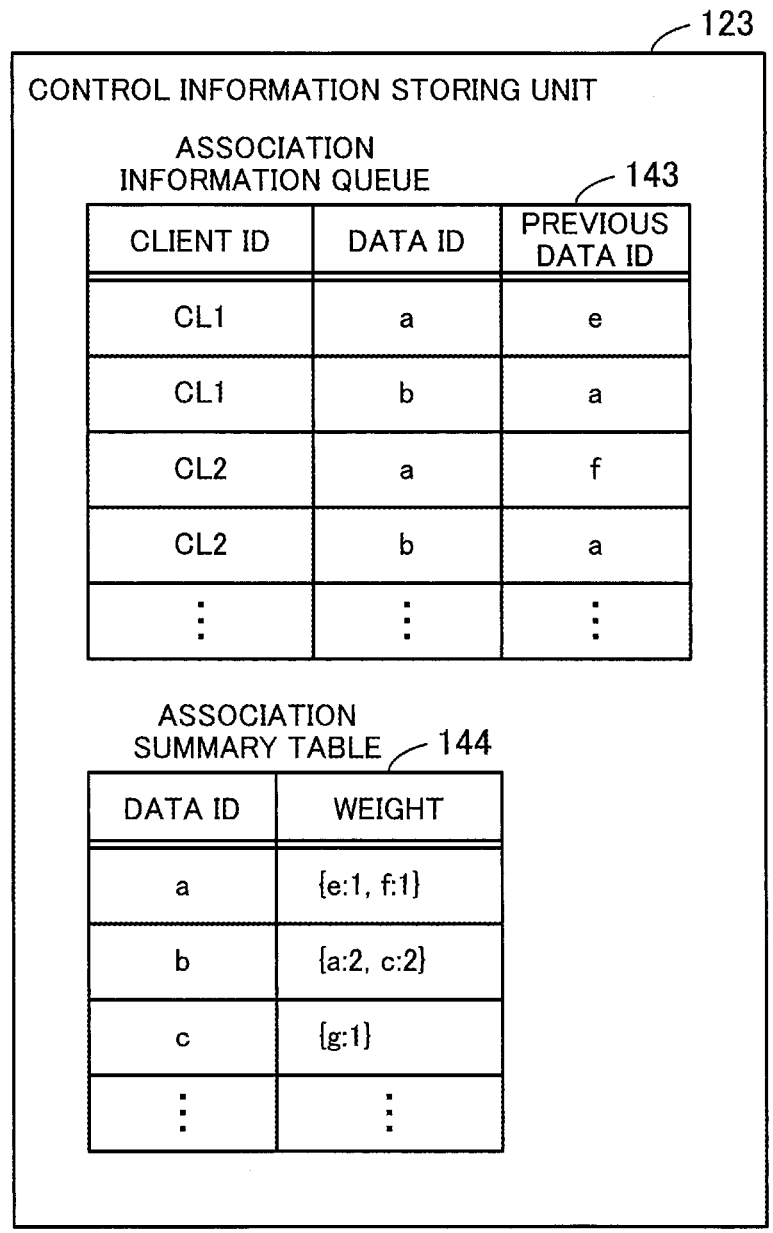
FIG. 13 illustrates an example of an association information queue and an association summary table.

FIG. 13 illustrates an example of an association information queue and an association summary table. An association information queue 143 is formed in the control information storing unit 123. The association information queue 143 is a First In First Out (FIFO) list. Each time an access request is received, an association information piece is added to the association information queue 143. Each association information piece includes the following items: client identifier; data identifier; and previous data identifier. The client identifier is the identification information for identifying a client terminal having sent an access request. As client identifiers, communication addresses (e.g., Internet Protocol (IP) addresses) of the client terminals 21 and 22 may be used. The data identifier included in each association information piece is the data identifier of a unit data piece designated by the access request. The previous data identifier is the data identifier of a unit data piece designated by an access request sent by the same client terminal last time.

Each association information piece indicates an "association" between two unit data pieces, representing that a unit data piece identified by the data identifier has been accessed immediately after a unit data piece identified by the previous data identifier. The unit data piece accessed just before the currently accessed unit data piece is identified, for example, by searching the association information queue 143 for the most recent association information piece with the client identifier of the same client terminal making the current access. Note however that each of the client terminals 21 and 22 may add, to an access request as the previous data identifier, the data identifier of the unit data piece that the client terminal accessed just before the current access. A pair of unit data pieces each identified by a data identifier and a previous data identifier is sometimes referred to as an "associated data pair".

The association information pieces registered in the association information queue 143 are extracted one at a time according to the registration order when the relocation plan generating unit 134 generates relocation plans. Each association information piece used by the relocation plan generating unit 134 is deleted from the association information queue 143. In addition, when the data of a page is removed from the cache unit 122, association information pieces for unit data pieces belonging to the page are deleted from the association information queue 143. That is, association information pieces of pages being cached in the cache unit 122 and yet to be used for the data relocation examination are accumulated in the association information queue 143.

An association summary table 144 is stored in the control information storing unit 123. The association summary table 144 includes columns of data identifier and weight. Each field in the weight column contains one or more identification information pieces each indicating a unit data piece accessed just before a unit data piece identified by the corresponding data identifier. Each identification information piece in the weight column is followed by the number of times that the access sequence has occurred (hereinafter referred to as the "number of occurrences"). For example, weight information of {a:2, c:2} is registered for the data b. This indicates that the data b being accessed immediately after the data a have occurred twice, and the data b being accessed immediately after the data c have occurred twice.

Each time an association information piece is added to the association information queue 143, that is, each time an access request is received, the association summary table 144 is updated according to the added association information piece. With reference to the association summary table 144, the data identifier of a unit data piece allows finding the data identifier of one or more unit data pieces accessed immediately before the unit data piece and the number of occurrences of the associated data pair/s. When the data of a page is removed from the cache unit 122, weight information for each unit data piece belonging to the removed page is deleted from the association summary table 144. That is, the association summary table 144 aggregates the number of occurrences of associated data pairs related to individual pages being cached in the cache unit 122 and having occurred during the period of time the pages are being cached in the cache unit 122.

FIG. 14 illustrates an example of an overlap determination table and a parameter table. An overlap determination table 145 is stored in the control information storing unit 123. The overlap determination table 145 is used by the relocation plan selecting unit 135 to detect data relocation plans whose influence ranges overlap one another. The overlap determination table 145 includes columns of data identifier and influence flag. Each field in the influence flag column contains the influence flag indicating whether a unit data piece identified by the corresponding data identifier is included in the influence range of at least one data relocation plan. The influence flag set to 1 indicates that the unit data piece is included in the influence range of at least one data relocation plan. The influence flag set to 0 indicates that the unit data piece is not included in the influence range of any data relocation plan.

For example, the relocation plan selecting unit 135 sequentially selects a data relocation plan generated by the relocation plan generating unit 134. The relocation plan selecting unit 135 identifies one or more unit data pieces included in the influence range of the selected data relocation plan and, then, sets the influence flag of each of the unit data pieces to "1". In this regard, the relocation plan selecting unit 135 determines whether the influence flag is already set to "1" before the change. If the influence flag is already set to "1" before the change, it is determined that the influence range of the data relocation plan overlaps that of a different data relocation plan.

A parameter table 146 is stored in the control information storing unit 123. The parameter table 146 registers names and values of parameters used by the relocation plan selecting unit 135 to calculate the benefit and cost of each data relocation. At least some of the parameter values may be set by the user. In addition, at least some of the parameter values may be calculated by the server device 100 monitoring access to the HDD 103 and the RAM 102.

The parameter names include writing speed, reading speed, and recurrence rate. The writing speed indicates an amount of time needed to write the data of one page back to the HDD 103 from the RAM 102. The reading speed indicates an amount of time needed to load the data of one page from the HDD 103 into the RAM 102. The unit of writing speed and reading speed is, for example, the millisecond per page (ms/page). As for the writing speed and reading speed, the user may estimate them based on expected values of the physical performance of the HDD 103 and the page size, and preliminarily register them in the parameter table 146. Alternatively, the user may obtain the writing speed and reading speed by actual measurements, and preliminarily register, in the parameter table 146, the average of the measured values for each of the speeds. Further, the server device 100 may monitor the writing speed and reading speed of the HDD 103 and update the values of these speeds registered in the parameter table 146 on a continuous basis.

The recurrence rate is the probability that a pair of unit data pieces is successively accessed again within a certain amount of time after the last access. That is, the recurrence rate is the probability that an associated data pair occurs again within a certain amount of time after the same associated data pair occurred last time. The parameter table 146 may include either individual recurrence rates each for a different pair of unit data pieces, or the average value of the recurrence rates of all the pairs. The user may obtain such recurrence rates by actual measurements and preliminarily register them in the parameter table 146, and the server device 100 may update the recurrence rates based on the association information pieces on a continuous basis.

FIG. 15 illustrates an example of a history table and an interference rate table. A history table 147 is stored in the control information storing unit 123. The history table 147 is updated by the relocation control unit 133 when a data relocation is carried out, and then referred to by the cache control unit 132 afterwards. The history table 147 includes columns of data identifier and relocation flag. Each field in the relocation flag column contains a relocation flag indicating whether a unit data piece identified by the corresponding data identifier was transferred in the most recent data relocation. The relocation flag set to 1 indicates that the unit data piece was transferred while the relocation flag set to 0 indicates that the unit data piece was not transferred.

An interference rate table 148 is stored in the control information storing unit 123. The interference rate table 148 is referred to by the relocation plan selecting unit 135, and updated by the cache control unit 132, the relocation plan selecting unit 135, and the interference rate updating unit 136. The interference rate table 148 includes columns of influence range level, interference rate, total evaluation value, and cache miss count.

Each field in the influence range level column contains the name of an influence range level. For example, as illustrated in FIGS. 9A, 9B, and 9C, the names of the three influence range levels, "relocation data", "direct association data", and "page", are registered. Each field in the interference rate column contains the interference rate associated with the corresponding influence range level. An initial value of the interference rate is "1". Each field in the total evaluation value column contains the total evaluation value for a combination of data relocation plans selected according to the corresponding influence range level. The total evaluation value is a value before correction using the corresponding interference rate. Each field in the cache miss count column contains the number of cache misses having occurred for transferred unit data pieces within a certain amount of time after a data relocation.

Once determining a combination of data relocation plans to be executed, the relocation plan selecting unit 135 registers the sum of the evaluation values of the data relocation plans in the interference rate table 148 in association with an influence range level used to select the combination. The cache control unit 132 monitors cache misses for a predetermined amount of time after a data relocation is carried out. If a cache miss occurs and the relocation flag of a requested unit data piece is set to "1", the cache control unit 132 increases a corresponding cache miss count in the interference rate table 148 by 1. Note that the cache miss count to be updated here corresponds to an influence range level used in the most recent data relocation.

When a predetermined amount of time elapses after a data relocation, the interference rate updating unit 136 updates a corresponding interference rate based on the total evaluation value and cache miss count in the interference rate table 148. Note that the interference rate to be updated here corresponds to an influence range level used in the most recent data relocation. For example, the interference rate updating unit 136 sets the ratio of the total evaluation value to the cache miss count (i.e., a value obtained by dividing the total evaluation value by the cache miss count) as a new interference rate. The updated interference rate is referred to next time the relocation plan selecting unit 135 examines a data relocation.

Figure 16:
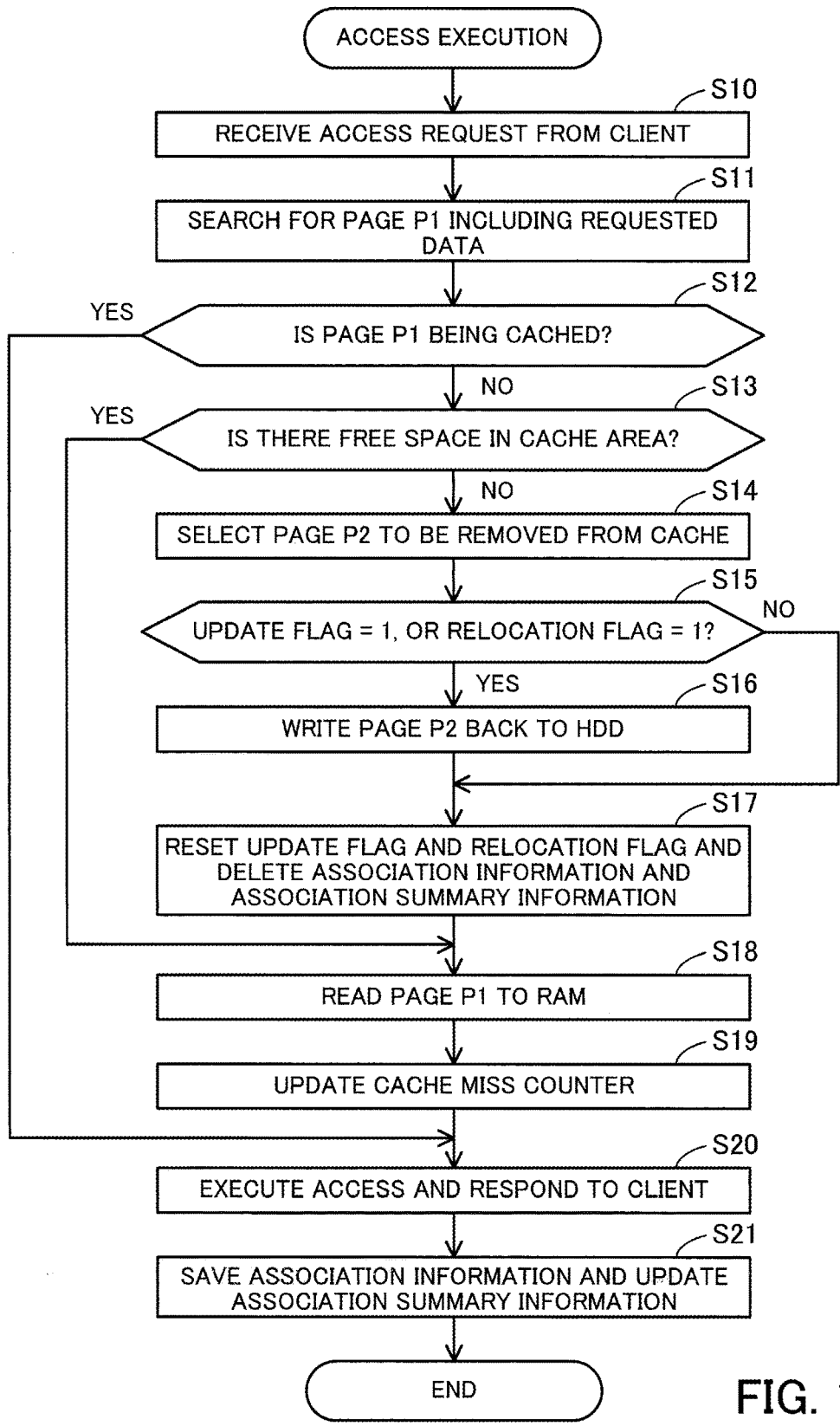
FIG. 16 is a flowchart illustrating an example of a procedure for access execution.

Next described are processing procedures executed by the server device 100. FIG. 16 is a flowchart illustrating an example of a procedure for access execution.

[Step S10] The access executing unit 131 receives an access request from one of the client terminals 21 and 22 via the network 20. The access request is a read request for reading a unit data piece or a write request for updating a unit data piece.

[Step S11] With reference to the search table 141 stored in the control information storing unit 123, the access executing unit 131 searches for a page P1 including the unit data piece designated by the access request.

[Step S12] The cache control unit 132 determines whether the page P1 is being cached, i.e., whether the data of the page P1 is stored in the cache unit 122. If the page P1 is being cached, the process moves to step S20. If the page P1 is not yet cached, the process moves to step S13.

Note that in order to determine whether each page is being cached, the cache control unit 132 may hold a list indicating pages being cached or a list indicating pages yet to be cached. Alternatively, the reverse search table 142 may list only information on pages being cached so that the cache control unit 132 is able to determine whether a desired page is being cached by checking if information on the page is present in the reverse search table 142. Alternatively, a flag indicating if each page is being cached may be added to the reverse search table 142.

[Step S13] The cache control unit 132 determines whether free space to store the data of the page P1 exists in the cache area of the cache unit 122. Whether there is sufficient free space in the cache area may be determined based on whether the number of pages being cached has reached a predetermined upper limit. If there is free space in the cache area, the process moves to step S18. If the cache area is insufficient, the process moves to step S14.

[Step S14] The cache control unit 132 selects, amongst a plurality of pages being cached, a page P2 to be removed from the cache unit 122. Various algorithms are available to select the page P2 (such algorithms are sometimes referred to as "cache algorithms" and "replacement algorithms"). For example, Least Recently Used (LRU), Least Frequently Used (LFU), or FIFO may be used. The cache control unit 132 may hold information according to an algorithm to be used (for example, the number of times each page has been accessed).

[Step S15] The cache control unit 132 acquires, from the reverse search table 142, the update flag and the relocation flag corresponding to the page P2 selected in step S14. Then, the cache control unit 132 determines whether the update flag is set to 1 or the relocation flag is set to 1, i.e., whether one or more unit data pieces included in the page P2 has been updated or the page P2 has been subject to a data relocation. If the update flag is set to 1 or the relocation flag is set to 1, the process moves to step S16. Otherwise, the process moves to step S17.

[Step S16] The cache control unit 132 writes all the data of the page P2 stored in the cache unit 122 back to the data storing unit 121. That is, the data of the page P2 being cached in the RAM 102 is written back to the HDD 103.

[Step S17] The cache control unit 132 resets the update flag and the relocation flag corresponding to the page P2 registered in the reverse search table 142 to "0". In addition, the cache control unit 132 searches the reverse search table 142 for unit data pieces included in the page P2, and then deletes, from the association information queue 143 and the association summary table 144, an association information piece and an association summary information piece of each of the unit data pieces found in the search. Note that the cache control unit 132 discards the data of the page P2 from the cache unit 122. In this regard, the cache control unit 132 may explicitly delete the data of the page P2 from the cache unit 122, or may set a storage area allocated to the page P2 to be overwritable without deleting the data of the page P2.

[Step S18] The cache control unit 132 reads all the data of the page P1 found in step S11 from the data storing unit 121 to the cache unit 122 in the RAM 102.

[Step S19] The cache control unit 132 acquires, from the history table 147, the relocation flag corresponding to the unit data piece designated by the access request. Then, the cache control unit 132 determines whether the relocation flag is set to 1, i.e., whether the designated unit data piece was transferred in the last data relocation. If the relocation flag is set to 1, the cache control unit 132 updates, within the interference rate table 148, the cache miss count corresponding to an influence range level adopted for the last data relocation by increasing it by 1.

[Step S20] The access executing unit 131 executes access to the data stored in the cache unit 122 according to the received access request, and offers a response to the client terminal having transmitted the access request. If the access request is a read request, the access executing unit 131 extracts, from the cache unit 122, the unit data piece designated by the access request and, then, transmits it to the access-requestor client terminal. If the access request is a write request, the access executing unit 131 updates, in the cache unit 122, the unit data piece designated by the access request and, then, notifies the access-requestor client terminal of the success or failure of the update. In addition, the access executing unit 131 sets the update flag of the page P1 registered in the reverse search table 142 to "1".

[Step S21] The access executing unit 131 generates an association information piece according to the received access request and saves it in the association information queue 143 formed in the control information storing unit 123. The association information piece includes the identification information of the client terminal having transmitted the access request and the identification information of the unit data piece designated by the access request. The association information piece also includes the identification information of a unit data piece accessed last time upon request of the same client terminal. The unit data piece accessed last time is identified, for example, by searching the association information queue 143 for the most recent association information piece with the client identifier of the same client terminal. If the identification information of the unit data piece accessed last time is attached to the access request, the access executing unit 131 is able to simply use the identification information.

In addition, using the association information piece, the access executing unit 131 updates an association summary information piece of the association summary table 144. Specifically, the access executing unit 131 increases, in the association summary table 144, the weight of the unit data piece accessed last time corresponding to the unit data piece accessed this time by just 1.

Figure 17:
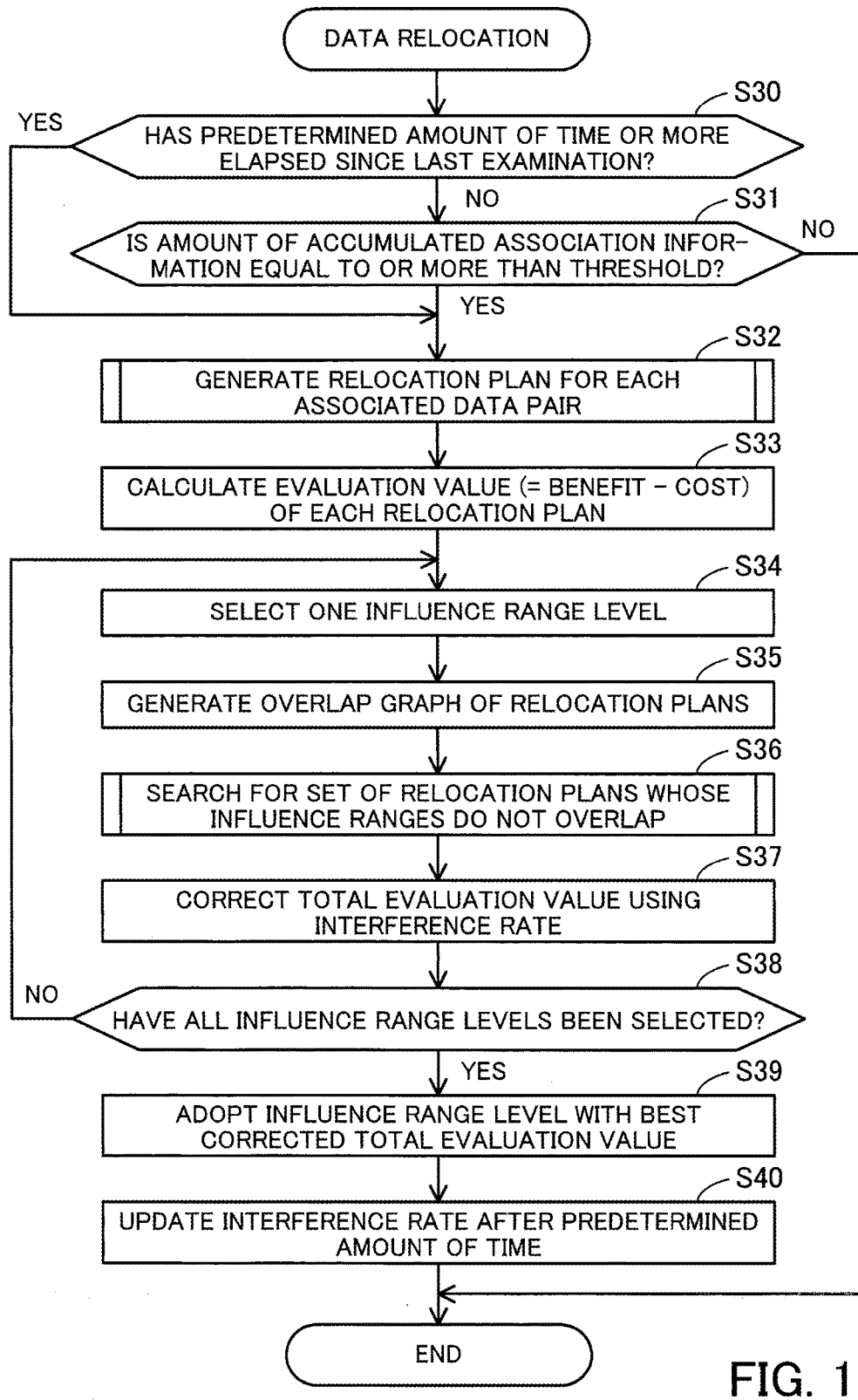
FIG. 17 is a flowchart illustrating an example of a procedure for a data relocation.

FIG. 17 is a flowchart illustrating an example of a procedure for a data relocation.

[Step S30] The relocation plan generating unit 134 determines whether a predetermined amount of time or more has elapsed since a data relocation examination illustrated in steps S32 to S40 below is made last time. If the predetermined amount of time or more has elapsed since the last data relocation examination, the process moves to step S32 and a data relocation examination is started. If the predetermined amount of time has not elapsed, the process moves to step S31.

[Step S31] The relocation plan generating unit 134 determines whether the amount of association information accumulated in the association information queue 143 (or, in other words, the number of associated data pairs indicated by the association information) is equal to or more than a predetermined threshold. If the condition is satisfied, the process moves to step S32 and the data relocation examination is started. If the condition is not satisfied, the data relocation examination is not started.

Note that, in FIG. 17, the two conditions in steps S30 and S31 are used as conditions to start the data relocation examination. Note however that only one of these conditions in steps S30 and S31 may be used as a start condition. Alternatively, a different start condition may be used in place of, or in combination with, steps S30 and 31. For example, amongst associated data pairs indicated by the association information, the number of associated data pairs whose unit data pieces reside on different pages may be counted and then compared to a predetermined threshold.

[Step S32] The relocation plan generating unit 134 generates one data relocation plan for each associated data pair listed in the association information queue 143. First, the relocation plan generating unit 134 extracts one associated data pair from the association information queue 143. The associated data pair to be extracted is, for example, the oldest one stored in the association information queue 143. The extracted associated data pair is deleted from the association information queue 143. In the following, of the associated data pair, the unit data piece accessed this time and the unit data piece accessed last time are sometimes denoted as m and n, respectively.

Then, the relocation plan generating unit 134 generates one data relocation plan involving a page M on which the unit data piece m resides and a page N on which the unit data piece n resides. The data relocation plan is expressed using identifiers of the pages M and N and the data identifier of each unit data piece transferred from one page to the other. Details of generating a data relocation plan are described later.

[Step S33] The relocation plan selecting unit 135 calculates the cost and benefit for each of the data relocation plans generated in step S32. The cost is calculated as: (the amount of increase in pages to be written back)×(the writing speed). As illustrated in FIGS. 5 and 6, the amount of increase in pages to be written back is calculated based on the update status of the pages M and N in the cache unit 122, and takes one of values 0, 1, and 2. The relocation plan selecting unit 135 checks the update flag of each of the pages M and N registered in the reverse search table 142, and calculates, of the pages M and N, the number of pages with the update flag set to 1 (i.e., the number of pages having undergone an update). The number of write-back pages increased by a data relocation is obtained by subtracting the number of pages having undergone an update from "2". The writing speed is found in the parameter table 146 stored in the control information storing unit 123.

The benefit is calculated as: (a decrease in the number of cuts between the pages M and N)×(the recurrence rate)×(the reading speed). The number of cuts between the pages M and N is the sum of the weights of associated data pairs, each composed of unit data pieces separately residing on the pages M and N, amongst the associated data pairs registered in the association summary table 144 stored in the control information storing unit 123. That is, the number of cuts between the pages M and N indicates the number of occurrences of associated data pairs, each composed of unit data pieces separately residing on the pages M and N, amongst associated data pairs having occurred during the period of time both the pages M and N are being cached this time. With reference to the association summary table 144, the relocation plan selecting unit 135 calculates the number of cuts in the current data arrangement and the number of cuts in a data arrangement after the data relocation, and obtains the decrease in the number of cuts by subtracting the latter from the former.

As for some of the associated data pairs, each composed of unit data pieces individually residing on the pages M and N, the data relocation may cause both the unit data pieces to reside on either one of the pages M and N, thus improving the access performance. On the other hand, as for some associated data pairs, each composed of unit data pieces residing on either one of the pages M and N, the data relocation may cause the unit data pieces to separately reside on the pages M and N, thus decreasing the access performance. The decrease in the number of cuts reflects both an improvement of the access performance for some associated data pairs and a decrease in the access performance for others, and therefore, serves as an index indicating the overall degree of improvement in the arrangement of unit data pieces achieved by the data relocation.

The recurrence rate indicates the probability that associated data pairs whose unit data pieces residing separately on the pages M and N occur again within a certain amount of time from this point forward, and is found in the parameter table 146. The reading speed is also found in the parameter table 146. Then, the relocation plan selecting unit 135 calculates an evaluation value for each of the data relocation plans by subtracting the cost from the benefit.

[Step S34] The relocation plan selecting unit 135 selects one influence range level from the interference rate table 148 stored in the control information storing unit 123. There are three influence range levels: the relocation data level; the direct association data level; and the page level.

[Step S35] According to the influence range level selected in step S34, the relocation plan selecting unit 135 identifies unit data pieces included in the influence range of each of the data relocation plans generated in step S32. When selecting the relocation data level, the relocation plan selecting unit 135 includes, in the influence range, only transfer-target unit data pieces indicated by the data relocation plan. When selecting the direct association data level, the relocation plan selecting unit 135 searches the association summary table 144 for unit data pieces directly associated with the individual transfer-target unit data pieces, and includes, in the influence range, the found unit data pieces together with the transfer-target unit data pieces. When selecting the page level, the relocation plan selecting unit 135 searches the reverse search table 142 for all unit data pieces belonging to the same page as each of the transfer-target unit data pieces, and includes them in the influence range.

Once the influence range of each of the data relocation plans is identified, the relocation plan selecting unit 135 detects one or more pairs of data relocation plans whose influence ranges overlap one another (the same unit data piece is included in their influence ranges), using the overlap determination table 145 stored in the control information storing unit 123. Then, the relocation plan selecting unit 135 generates an overlap graph including nodes corresponding to the data relocation plans. In the overlap graph, a pair of nodes corresponding to each pair of data relocation plans whose influence ranges overlap one another is connected by an edge.

[Step S36] Using the overlap graph generated in step S35, the relocation plan selecting unit 135 searches the data relocation plans generated in the step S32 for a set of data relocation plans whose influence ranges do not overlap one another. This set includes one or more data relocation plans. The influence ranges of the set of data relocation plans not overlapping one another means any two data relocation plans corresponding to neighboring nodes (i.e., nodes connected by an edge) in the overlap graph being not selected. Details of the selection of a data relocation plan/s are described later.

[Step S37] The relocation plan selecting unit 135 sums, amongst the evaluation values calculated in step S33, the evaluation value/s of the data relocation plan/s selected in step S36 and thereby obtains a total evaluation value. In addition, the relocation plan selecting unit 135 searches the interference rate table 148 for the interference rate corresponding to the influence range level selected in step S34. Then, the relocation plan selecting unit 135 multiplies the total evaluation value by the interference rate to thereby correct the total evaluation value. The correction of the total evaluation value is performed to estimate the degree of interference occurring between/among the selected data relocation plans and reflect the interference in the total evaluation value.

[Step S38] The relocation plan selecting unit 135 determines whether all the influence range levels have been selected in step S34. If all the influence range levels have been selected, the process moves to step S39. If one or more influence range levels remain unselected, the process moves to step S34.

[Step S39] The relocation plan selecting unit 135 adopts, amongst a plurality of influence range levels registered in the interference rate table 148, one influence range level with the best corrected total evaluation value (for example, the highest corrected total evaluation value is adopted if the corrected total evaluation value taking a higher value is better) calculated in step S37. Then, the relocation plan selecting unit 135 determines, as data relocation plans to be executed, the data relocation plan/s selected in step S36 according to the adopted influence range level. In addition, the relocation plan selecting unit 135 registers, in the interference rate table 148, the total evaluation value (before the correction) of the data relocation plan/s to be executed in association with the adopted influence range level. The relocation control unit 133 transfers unit data pieces between pages according to the determined data relocation plan/s. In the case where two or more data relocation plans have been determined as the data relocation plans to be executed, the relocation control unit 133 may execute the determined data relocation plans in any order.

[Step S40] The interference rate updating unit 136 waits until a predetermined amount of time has elapsed after the relocation control unit 133 carried out the data relocation. When the predetermined amount of time has elapsed, the interference rate updating unit 136 searches the interference rate table 148 for a total evaluation value and a cache miss count corresponding to the influence range level adopted in step S39. Then, the interference rate updating unit 136 updates the interference rate corresponding to the adopted influence range level to "(the found total evaluation value) (the found cache miss count)". The interference rate becomes lower with a larger number of cache misses. That is, when no improvement in the access performance is seen in the event, the total evaluation value is corrected to be low from then on based on the judgment that expected effects have not been obtained due to interference between/among the data relocation plans.

Figure 18:
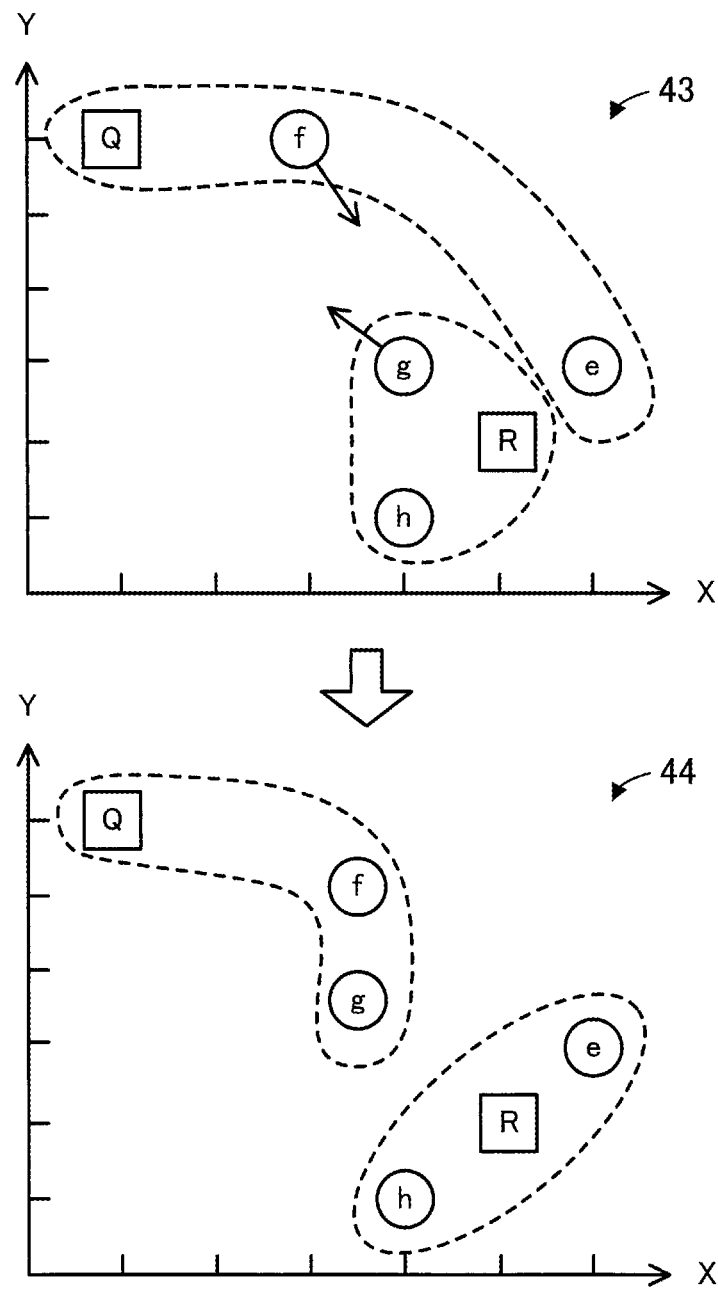
FIG. 18 illustrates an example of generation of a data relocation plan according to centroid clustering.

Next described is the generation of a data relocation plan performed in step S32. The following describes centroid clustering and union-split clustering as examples of how to generate a data relocation plan. FIG. 18 illustrates an example of the generation of a data relocation plan according to the centroid clustering. In the centroid clustering, the strength of the association among unit data pieces (i.e., the possibility of the unit data pieces being accessed successively) is represented by the distance between them in an N-dimensional space (N is an integer equal to 2 or greater), and the unit data pieces are formed into groups in the N-dimensional space. Here, a two-dimensional space is used as an example. A graph 43 represents the association among unit data pieces before an associated data pair extracted from the association information queue 143 is applied. A graph 44 represents the association among the unit data pieces after the extracted associated data pair is applied.

In the centroid clustering, coordinates are given to each page and unit data piece. Pages are preliminarily given coordinates in such a manner that their coordinates lie sufficiently away from one another. Each unit data is given initial coordinates located near the coordinates of a page to which the unit data piece belongs. The pages Q and R (the pages 32 and 33, respectively) and the unit data pieces e, f, g, and h are placed in the graph 43. In the initial state, the use of a predetermined grouping technique allows the unit data pieces e and f to be placed into the same group as the page 32 and the unit data pieces g and h to be placed into the same group as the page 33. Such a conceivable grouping technique would be, for example, for each page to take a unit data piece with the coordinates closest to the page into its own group in turns amongst unit data pieces for which groups are yet to be determined. In the case of the graph 43, the page Q selects the unit data piece f and the page R selects the unit data piece g in the first round. Then, in the second round, the page Q selects the unit data piece e and the page R selects the unit data piece h. Herewith, the grouping is achieved in such a manner that the unit data pieces e and f belong to the page Q and the unit data pieces g and h belong to the page R.

In this condition, when the relocation plan generating unit 134 extracts an associated data pair from the association information queue 143, the coordinates of unit data pieces are changed according to the associated data pair. Specifically, the coordinates of each unit data piece included in the associated data pair are changed to be closer to the coordinates of a page to which the other unit data piece belongs. In the case where access is made to the unit data piece g immediately after the unit data piece f, the coordinates of the unit data piece f are changed to be closer to the coordinates of the page R and the coordinates of the unit data piece g are changed to be closer to the coordinates of the page Q, as illustrated in the graph 43. This represents that the association of the unit data piece f and the page R becomes stronger than in the current data arrangement and the association of the unit data piece g and the page Q becomes stronger than in the current data arrangement. The amount of displacement of the coordinates in the two-dimensional space may be fixed. Alternatively, the amount of displacement of the coordinates may be a fixed percentage (for example, 10%) of the distance between the coordinates of a unit data piece and the coordinates of a page to which the unit data piece is to be brought closer (for example, the distance between the coordinates of the unit data piece f and those of the page R).

When the coordinates of unit data pieces have been changed in the two-dimensional space, groups of unit data pieces are recalculated using the above-described grouping technique. For example, in the case of the graph 44, the page Q selects the unit data piece f and the page R selects the unit data piece h in the first round. Then, in the second round, the page Q selects the unit data piece g and page R selects the unit data piece e. Herewith, the unit data pieces f and g belong to the page Q and the unit data pieces e and h belong to the page R. This presents a data relocation plan to transfer the unit data piece e from the page Q to the page R and the unit data piece g from the page R to the page Q.

FIG. 19 illustrates an example of a coordinate table. In the case where the centroid clustering is used to generate a data relocation plan, a coordinate table 149 is stored in the control information storing unit 123. The coordinate table 149 includes columns of node identifier and coordinates. Each field in the node identifier column contains the identification information of a node placed in the N-dimensional space. As for the node identifiers, a page identifier is used for each page and a data identifier is used for each unit data piece. Current coordinates of each page and unit data piece in the N-dimensional space are associated with its node identifier. The coordinates of each unit data piece may be updated by the relocation plan generating unit 134, as described above. Even if a page is removed from the cache unit 122, there is no need to remove information of the page from the coordinate table 149.

Figure 20:
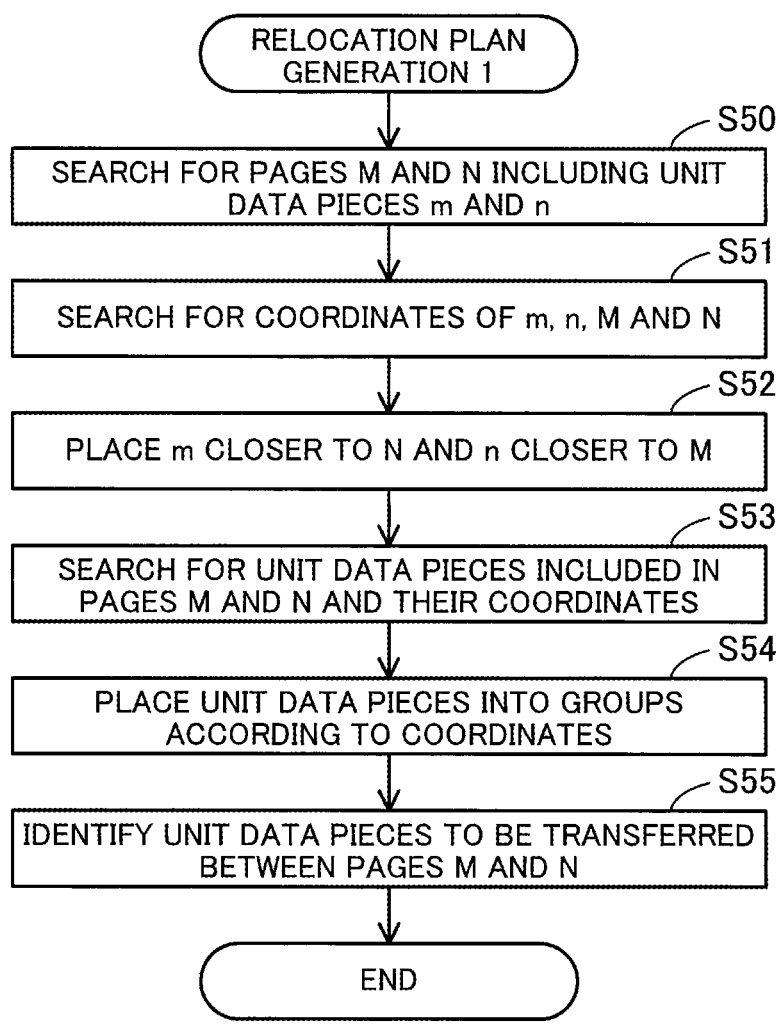
FIG. 20 is a flowchart illustrating an example of a procedure for first relocation plan generation.

FIG. 20 is a flowchart illustrating an example of a procedure for first relocation plan generation. The first relocation plan generation is carried out in step S32 above.

[Step S50] The relocation plan generating unit 134 searches the search table 141 stored in the control information storing unit 123 for the pages M and N including the unit data pieces m and n, respectively.

[Step S51] The relocation plan generating unit 134 searches the coordinate table 149 stored in the control information storing unit 123 for coordinates corresponding to the unit data pieces m and n and the pages M and N.

[Step S52] The relocation plan generating unit 134 changes the coordinates of the unit data piece m to be closer to the coordinates of the page N. For example, the relocation plan generating unit 134 changes, in the coordinate table 149, the coordinates of the unit data piece m in such a manner that the distance between the coordinates of the unit data piece m and those of the page N is reduced by 10%. In addition, the relocation plan generating unit 134 changes the coordinates of the unit data piece n to be closer to the coordinates of the page M. For example, the relocation plan generating unit 134 changes, in the coordinate table 149, the coordinates of the unit data piece n in such a manner that the distance between the coordinates of the unit data piece n and those of the page M is reduced by 10%.

[Step S53] The relocation plan generating unit 134 searches the reverse search table 142 stored in the control information storing unit 123 for all the unit data pieces included in the pages M and N. Then, the relocation plan generating unit 134 searches the coordinate table 149 for the coordinates of each of the found unit data pieces.

[Step S54] The relocation plan generating unit 134 places the unit data pieces found in step S53 into groups, using the coordinates of these unit data pieces and the coordinates of the pages M and N. This grouping operation gives consideration to the distance between the coordinates of the pages M and N and the coordinates of each of the unit data pieces. It is preferable that each unit data piece located closer to the page M belong to the page M and each unit data piece located closer to the page N belong to the page N. For example, the pages M and N select in turns, amongst unselected unit data pieces, one unit data piece closest to the page.

[Step S55] The relocation plan generating unit 134 compares the current data arrangement of the pages M and N and their data arrangement obtained in step S54, and identifies unit data pieces to be transferred between the pages M and N. Herewith, a data relocation plan between the pages M and N is generated.

Figure 21:
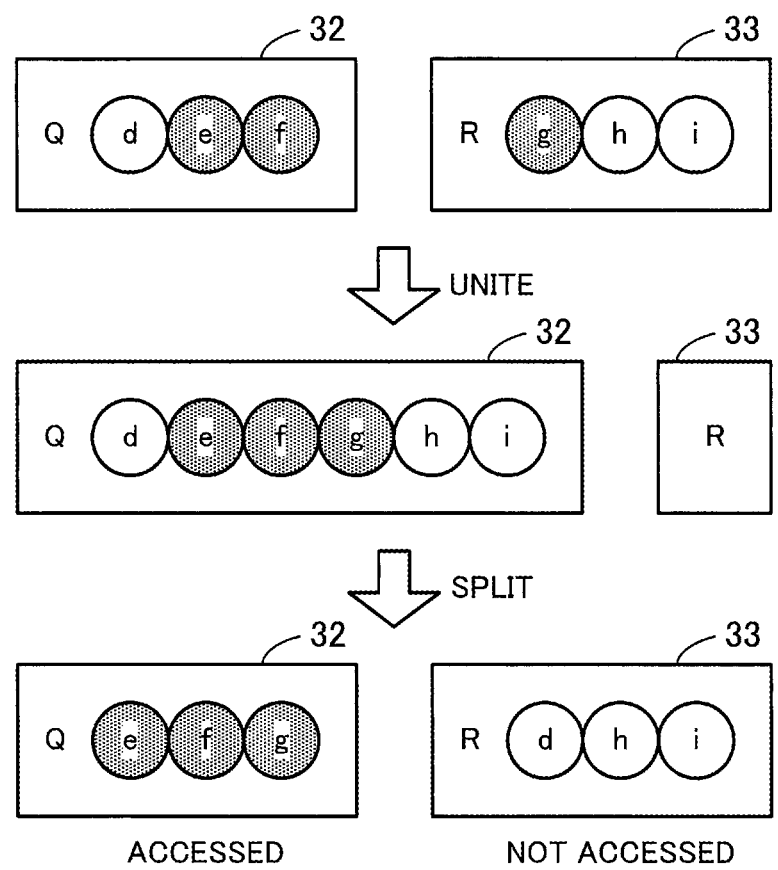
FIG. 21 illustrates an example of generation of a data relocation plan according to union-split clustering.

FIG. 21 illustrates an example of the generation of a data relocation plan according to the union-split clustering. According to the union-split clustering, when the relocation plan generating unit 134 extracts an associated data pair from the association information queue 143, two pages corresponding to the associated data pair are united. In the page union, all unit data pieces belonging to one page (referred to as the "first page") are transferred to the other page (the "second page"). The first page after the union is an empty page including no unit data piece. Note however that the amount of the unit data (or the number of the unit data pieces) included in the second page after the union may exceed an upper limit. In that case, according to the access status of each of the unit data pieces, the second page after the union is split. In the page split, the unit data pieces brought together on the second page are grouped into those accessed and those not accessed while being cached in the cache unit 122 this time. Then, the unit data pieces of either one of the groups are transferred to the first page.

Assume for example that the page 32 (the page Q) including the unit data pieces d, e, and f and the page 33 (the page R) including the unit data pieces g, h, and i are being cached in the cache unit 122. Assume also that during the pages Q and R being currently cached, immediately after access is made to the unit data piece e, access is made to the unit data piece f, which is immediately followed by access to the unit data piece g. Subsequently, the pages Q and R are united. For example, the unit data pieces g, h, and i included in the page R are transferred to the page Q. As a result, the page Q includes the unit data pieces d, e, f, g, h, and i while the page R becomes empty. However, in the case where the amount of unit data included in the page Q after the transfer exceeds a predetermined upper limit, the unit data pieces d, e, f, g, h, and i are grouped into the unit data pieces e, f, and g to which access has been made while they are being cached and the unit data pieces e, f, and g to which no access has been made. Then, the page Q is split. For example, the unit data pieces d, h, and i not accessed while being cached are transferred from the page Q to the page R. As a result, the page Q includes the unit data pieces e, f, and g and the page R includes the unit data pieces d, h, and i.

Figure 22:
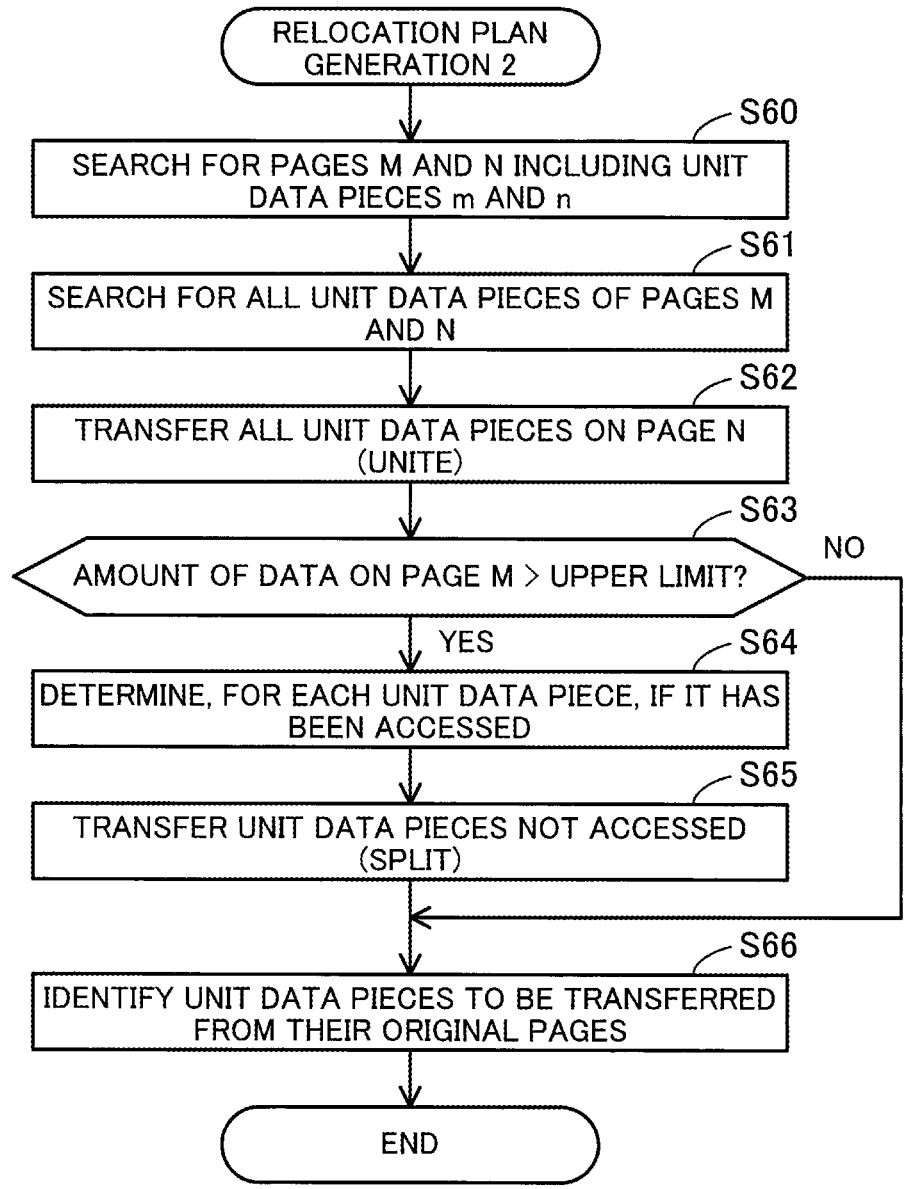
FIG. 22 is a flowchart illustrating an example of a procedure for second relocation plan generation.

FIG. 22 is a flowchart illustrating an example of a procedure for second relocation plan generation. The second relocation plan generation is carried out in step S32 above.

[Step S60] The relocation plan generating unit 134 searches the search table 141 stored in the control information storing unit 123 for the pages M and N including the unit data pieces m and n, respectively.

[Step S61] The relocation plan generating unit 134 searches the reverse search table 142 stored in the control information storing unit 123 for all the unit data pieces included in the pages M and N.

[Step S62] The relocation plan generating unit 134 generates a data relocation plan uniting the pages M and N. That is, the relocation plan generating unit 134 generates a data relocation plan to transfer all the unit data pieces on the page N to the page M. According to the data relocation plan, the page N becomes empty.

[Step S63] The relocation plan generating unit 134 determines whether the amount of data on the page M (for example, the number of unit data pieces) exceeds a predetermined upper limit if the data relocation plan generated in step S62 is adopted. If the amount of data on the page M exceeds the upper limit, the process moves to step S64. If the amount of data on the page M is equal to or less than the upper limit, the process moves to step S66.

[Step S64] The relocation plan generating unit 134 determines, for each of the unit data pieces brought together on the page M, whether it has been accessed while being cached in the cache unit 122 this time. Whether access has been made to each unit data piece is determined, for example, by referring to the association summary table 144 stored in the control information storing unit 123 to see if information on the unit data piece is registered.

[Step S65] The relocation plan generating unit 134 modifies the data relocation plan generated in step S62 in such a manner as to split the page M according to the state of access determined in step S64. Specifically, the relocation plan generating unit 134 modifies the data relocation plan in such a manner as to transfer, amongst the unit data pieces brought together on the page M, unit data pieces having not been accessed to the page N.

[Step S66] Based on the data relocation plan generated in step S62 or modified in step S65, the relocation plan generating unit 134 identifies unit data pieces to be transferred. Herewith, a data relocation plan involving the pages M and N is established.

Note that the relocation plan generating unit 134 needs to use only one of a plurality of data relocation plan generating methods including the centroid clustering and union-split clustering. A generating method to be used is, for example, preliminarily set in the relocation plan generating unit 134 by the user. The centroid clustering allows the arrangement of data to be gradually changed according to the increase in the number of occurrences of each associated data pair, and is thus suited for long-term optimization of the data arrangement. The union-split clustering has the advantage of quickly modifying the data arrangement in response to the occurrence of a new associated data pair.

Figure 23:
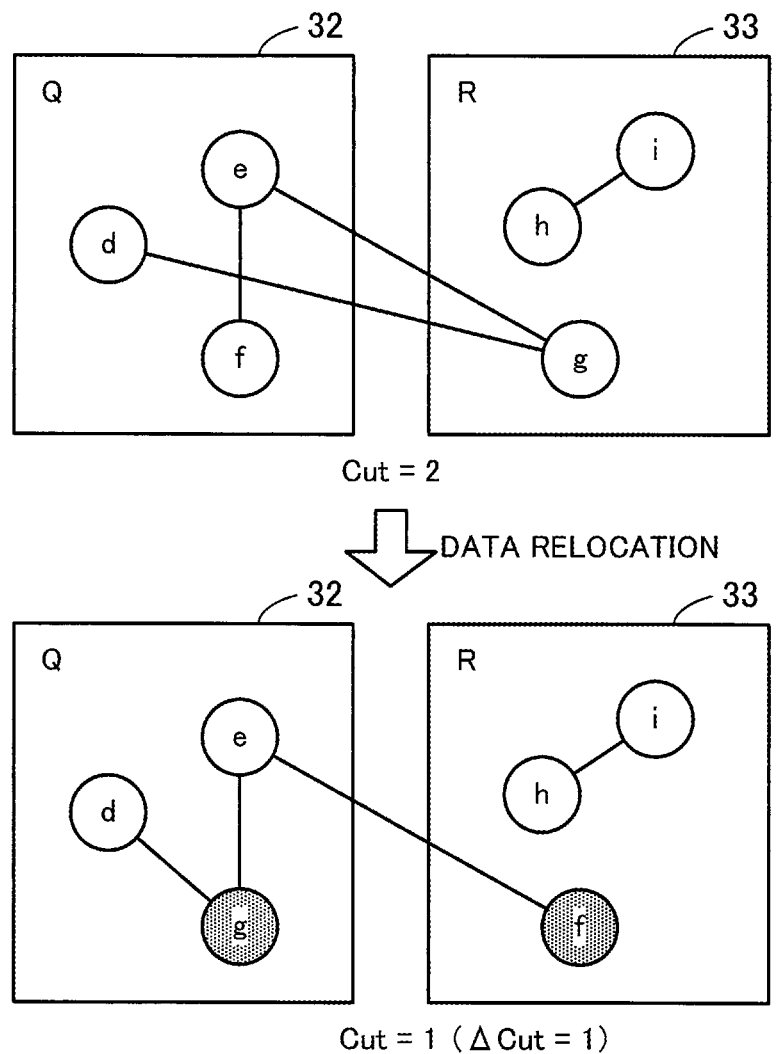
FIG. 23 illustrates an example of a change in the number of cuts before and after a data relocation.

Next presented is a supplementary description of the decrease in the number of cuts calculated in step S33 above. FIG. 23 illustrates an example of a change in the number of cuts before and after a data relocation. Assume here that the unit data pieces d, e, and f are included in the page 32 (the page Q) and the unit data pieces g, h, and i are included in the page 33 (the page R). Then, assume that the unit data pieces d and g, the unit data pieces e and f, the unit data pieces e and g, and the unit data pieces h and i are successively accessed. Assume in addition that a data relocation plan to transfer the unit data piece f to the page R and the unit data piece g to the page Q is generated.

Before the data relocation, the associated data pairs each composed of the unit data pieces d and g and the unit data pieces e and g have their unit data pieces residing separately on different pages, the pages Q and R. Therefore, the number of cuts before the data relocation is "2". On the other hand, according to the generated data relocation plan, the associated data pairs each composed of the unit data pieces d and g and the unit data pieces e and g have their unit data pieces residing on the same page (the page Q) after the data relocation although the associated data pair composed of the unit data pieces e and f has its unit data pieces residing separately on the pages Q and R. Therefore, the number of cuts after the data relocation is "1", and a decrease in the number of cuts (ΔCut) is calculated as "1". ΔCut is viewed as an index reflecting how good or bad the generated data relocation plan is.

Figure 24:
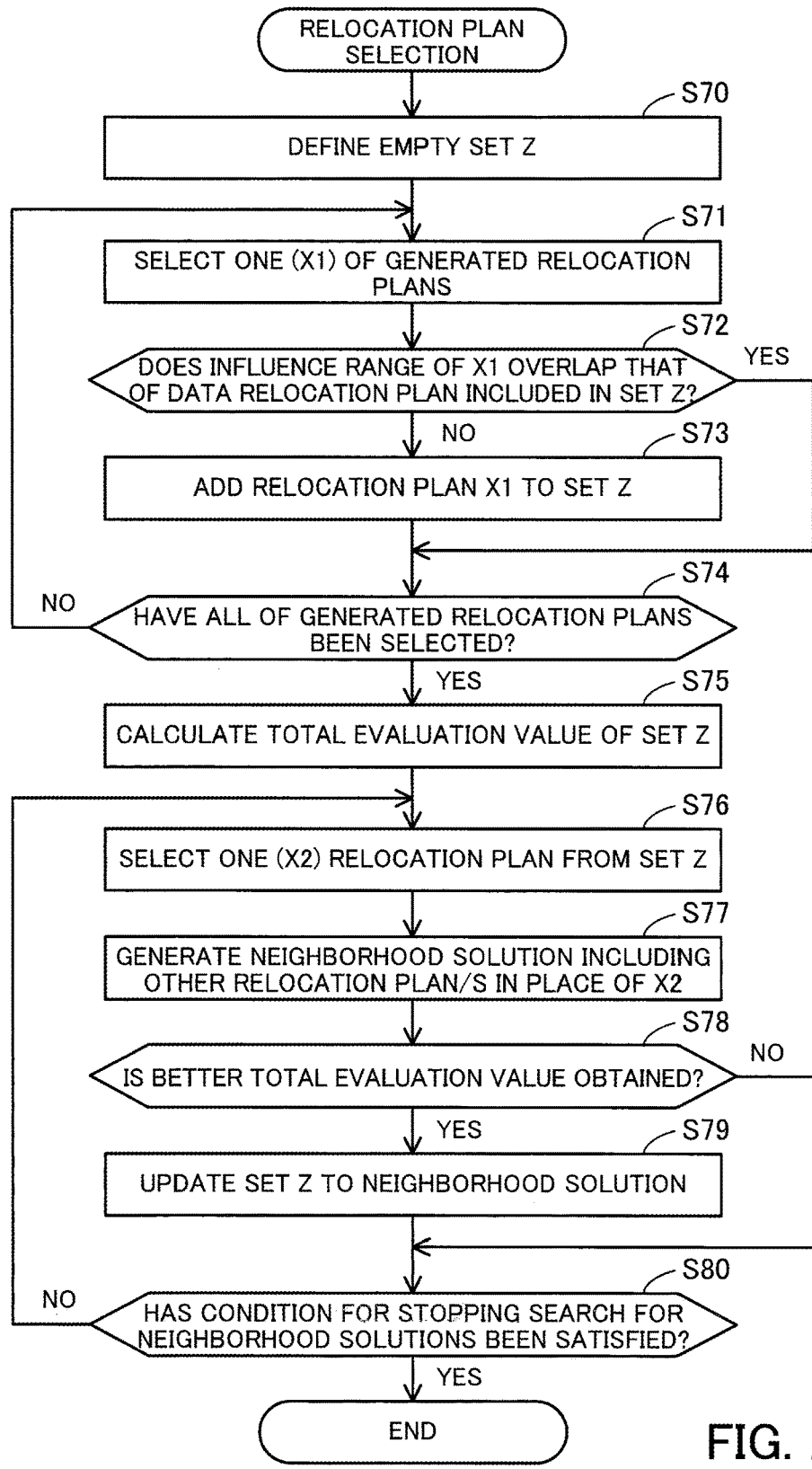
FIG. 24 is a flowchart illustrating an example of a procedure for relocation plan selection.

Next described is the selection of data relocation plan/s performed in step S36 above. FIG. 24 is a flowchart illustrating an example of a procedure for relocation plan selection.

[Step S70] The relocation plan selecting unit 135 defines an empty set Z.

[Step S71] The relocation plan selecting unit 135 selects, amongst the data relocation plans generated in step S32 described above, one data relocation plan (data relocation plan X1). This operation corresponds to selecting one node from the overlap graph generated in step S35.

[Step S72] The relocation plan selecting unit 135 determines whether the influence range of the data relocation plan X1 selected in step S71 overlaps the influence range of any data relocation plan belonging to the set Z. Whether the influence ranges overlap one another is determined, for example, by checking, on the overlap graph, if a node corresponding to the data relocation plan X1 is connected by an edge to a node corresponding to a data relocation plan belonging to the set Z. If the influence range of the data relocation plan X1 overlaps that of a data relocation plan belonging to the set Z, the process moves to step S74. If not, the process moves to step S73.

[Step S73] The relocation plan selecting unit 135 adds the data relocation plan X1 to the set Z.

[Step S74] The relocation plan selecting unit 135 determines whether all the generated data relocation plans have been selected in step S71. If all the data relocation plans have been selected, the process moves to step S75. If one or more data relocation plans remain unselected, the process moves to step S71.

[Step S75] The relocation plan selecting unit 135 sums the evaluation value/s of a data relocation plan/s belonging to the set Z at this point in time to thereby calculate a total evaluation value (before correction).

[Step S76] The relocation plan selecting unit 135 selects one data relocation plan (data relocation plan X2) from the data relocation plan/s belonging to the set Z.

[Step S77] The relocation plan selecting unit 135 searches data relocation plans not belonging to the set Z for one or more data relocation plans whose influence ranges do not overlap any of the data relocation plans belonging to the set Z except for the data relocation plan X2. Subsequently, the relocation plan selecting unit 135 generates a neighborhood solution which includes the data relocation plan/s found by the search in place of the data relocation plan X2.

[Step S78] The relocation plan selecting unit 135 calculates, in the same manner as step S75, a total evaluation value of the neighborhood solution generated in step S77. Then, the relocation plan selecting unit 135 determines whether the total evaluation value of the neighborhood solution is better than the total evaluation value of the current set Z (whether the former is higher than the latter if the total evaluation value taking a higher value is better). If the total evaluation value of the neighborhood solution is better, the process moves to step S79. Otherwise, the process moves to step S80.

[Step S79] The relocation plan selecting unit 135 updates the set Z to the neighborhood solution generated in step S77. That is, the relocation plan selecting unit 135 deletes the data relocation plan X2 from the set Z, and then adds the data relocation plan/s found in step S77 to the set Z.

[Step S80] The relocation plan selecting unit 135 determines whether the search for neighborhood solutions based on the combination of the data relocation plans indicated by the current set Z has been sufficiently extensive (whether a condition for stopping the search has been met). The condition for stopping the search is that, for example, all the conceivable neighborhood solutions without an update of the set Z have been explored, or the number of neighborhood solutions explored without an update of the set Z has reached a predetermined upper limit. If the condition for stopping the search is satisfied, the data relocation plan/s belonging to the set Z at this point in time are determined as a data relocation plan/s to be executed. Otherwise, the process moves to step S76.

Figure 25:
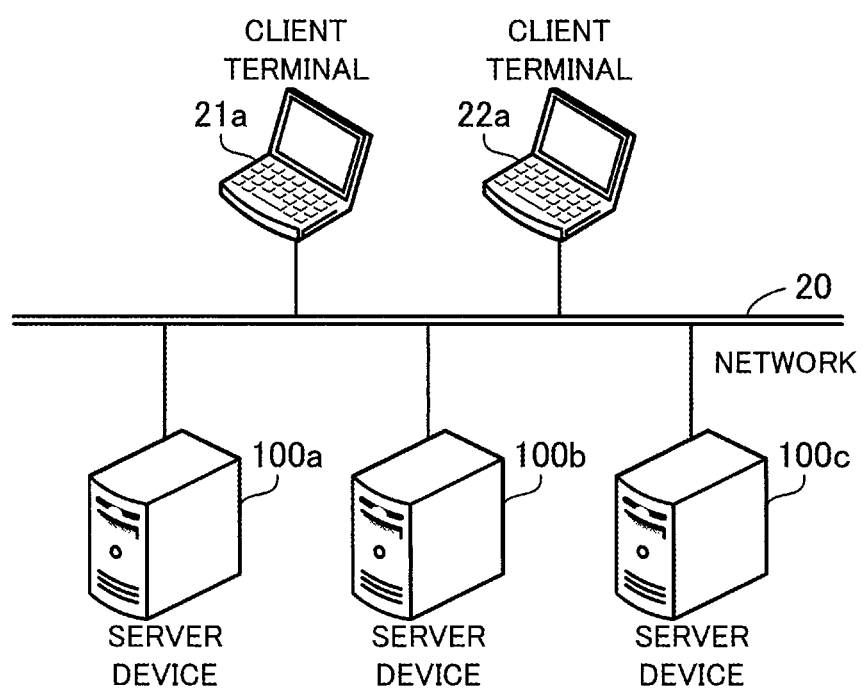
FIG. 25 illustrates an example of another information processing system.

Next described is a configuration modification of the information processing system according to the second embodiment. According to the above-described embodiment, the server device 100 solely manages data; however, a plurality of server devices may manage data in a dispersed manner. FIG. 25 illustrates an example of another information processing system. An information processing system according to the modification includes client terminals 21a and 22a and server devices 100a, 100b, and 100c. The client terminals 21a and 22a and the server devices 100a, 100b, and 100c are individually connected to the network 20. The server devices 100a, 100b, and 100c store data of a plurality of pages in a dispersed manner. For example, the server device 100a stores therein the data of the page 31; the server device 100b stores therein the data of the page 32; and the server device 100c stores therein the data of the page 33.

If knowing which server device stores a unit data piece for which access is desired, the client terminal 21a/22a transmits an access request to the server device. On the other hand, if not knowing which server device stores a unit data piece for which access is desired, the client terminal 21a/22a may transmit an access request to all the server devices 100a, 100b, and 100c, or may transmit an access request to only one of them. In the former case, only a server device storing the unit data piece designated by the access request responds to the requestor. In the latter case, the server device having received the access request transfers the access request to a server device storing the unit data piece designated by the access request. The server devices 100a, 100b, and 100c hold information indicating mappings between the pages and the server devices.

In order to detect access successiveness, the server devices 100a, 100b, and 100c interact to keep one another informed of the data identifier of the unit data piece designated by the received access request. Alternatively, the client terminal 21a/22a adds the data identifier of a unit data piece accessed last time to the access request. Herewith, the server devices 100a, 100b, and 100c are individually able to collect association information on unit data pieces stored in themselves. Using its collected association information, each of the server devices 100a, 100b, and 100c generates relocation plans for its own managing pages and carries out a data relocation. If one of the two pages involved in the data relocation belongs to a different server device, unit data pieces are transferred between server devices.

According to the information processing system of the second embodiment, an evaluation value is calculated for each of a plurality of data relocation plans. With respect to each of a plurality of influence range levels, the influence range of each data relocation plan is assumed and then a combination of data relocation plans yielding the best total evaluation value are calculated. Subsequently, the total evaluation value of each influence range level is corrected using a corresponding interference rate. The corrected total evaluation values of the plurality of influence range levels are compared against each other. One influence range level is selected by the comparison and thus a combination of data relocation plans to be executed are determined. In addition, data access status after the data relocation is monitored so that the interference rate corresponding to the selected influence range level is updated.

Herewith, it is possible to evaluate a plurality of data relocation plans in parallel and execute adopted two or more data relocation plans in any order. Therefore, compared to the case of sequentially evaluating a plurality of data relocation plans to determine whether to execute each of the data relocation plans, it is possible to reduce the time for examination of all the generated data relocation plans being completed. In addition, the evaluation value needs to be calculated only for each of the data relocation plans, and there is no need to calculate evaluation values for combinations of two or more data relocation plans. As a result, the need to calculate a huge number of combinations is eliminated, thus reducing the computation load of the server device 100.

In addition, in determining a data relocation plan/s to be adopted, a plurality of influence range levels whose assumed influence ranges differ in the extent of the influence are examined. This allows consideration of interference between/among data relocation plans without direct evaluations of combinations of two or more data relocation plans, and also enables the number of data relocation plans to be adopted to be appropriately adjusted. That is, it is possible to reduce the possibility of the access performance being not sufficiently improved due to a too small number of data relocation plans being adopted, and also reduces the possibility of expected effects not being achieved because of interference between/among data relocation plans due to too many data relocation plans being adopted. In addition, after execution of a data relocation, the access performance is monitored and a corresponding interference rate indicating the degree of interference is updated. This improves the accuracy in examining data relocation plans next time. As described above, it is possible to efficiently determine a combination of data relocation plans.

Note that the information processing of the first embodiment is implemented by causing a computer to execute a program, as described above. In addition, the information processing of the second embodiment is implemented by causing the client terminals 21 and 22 (or the client terminals 21a and 22a) and the server device 100 (or the server devices 100a, 100b, and 100c) to execute a program.

Such a program may be recorded in a computer-readable storage medium (for example, the storage medium 113). Examples of such a computer-readable storage medium include a magnetic disk, an optical disk, a magneto-optical disk, and semiconductor memory. Examples of the magnetic disk are a FD and a HDD. Examples of the optical disk are a compact disc (CD), CD-recordable (CD-R), CD-rewritable (CD-RW), DVD, DVD-R, and DVD-RW. The program may be recorded on each portable storage medium and then distributed. In such a case, the program may be executed after being copied from the portable storage medium to a different storage medium (for example, the HDD 103).

According to one aspect, it is possible to efficiently determine a combination of relocation processes to be executed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more, embodiments of the present invention have been described in detail, it should be understood that various changes, substitutions, and alterations could be made hereto without departing from the spirit and scope of the invention.

What is claimed is:

1. A data arrangement method comprising:
calculating, by a processor, an evaluation value for each of a plurality of relocation process options generated based on an access pattern to a plurality of unit data pieces stored in a storage device, each of the generated relocation process options indicating a relocation of one or more of the stored unit data pieces within the storage device;
selecting, by the processor, amongst a plurality of influence range levels, one influence range level based on the calculated evaluation values of the generated relocation process options and coefficients associated one-to-one with the influence range levels, the plurality of influence range levels indicating a plurality of assumed data ranges, each of the plurality of assumed data ranges being used to assume a set of unit data pieces whose access performances are affected by the relocation for each of the relocation process options;
determining, by the processor, amongst the generated relocation process options, one or more relocation processes to be executed based on the selected influence range level; and
updating, by the processor, the coefficient associated with the selected influence range level based on status of access to the stored unit data pieces after the determined relocation processes are executed,
the plurality of influence range levels include a first influence range level at which an assumed set of unit data pieces affected by the relocation of one of the stored unit data pieces does not include a different one of the stored unit data pieces accessed in association with the one of the stored unit data pieces and a second influence level at which the assumed set of unit data pieces affected by the relocation of the one of the stored unit data pieces includes the different one of the stored unit data pieces.

2. A data arrangement apparatus comprising:
a storage device configured to store a plurality of unit data pieces; and
a processor configured to perform a procedure including:
calculating an evaluation value for each of a plurality of relocation process options generated based on an access pattern to the plurality of unit data pieces stored in the storage device, each of the generated relocation process options indicating a relocation of one or more of the stored unit data pieces within the storage device;
selecting, amongst a plurality of influence range levels, one influence range level based on the calculated evaluation values of the generated relocation process options and coefficients associated one-to-one with the influence range levels, the plurality of influence range levels indicating a plurality of assumed data ranges, each of the plurality of assumed data ranges being used to assume a set of unit data pieces whose access performances are affected by the relocation for each of the relocation process options;
determining, amongst the generated relocation process options, one or more relocation processes to be executed based on the selected influence range level; and
updating the coefficient associated with the selected influence range level based on status of access to the stored unit data pieces after the determined relocation processes are executed,
the plurality of influence range levels include a first influence range level at which an assumed set of unit data pieces affected by the relocation of one of the stored unit data pieces does not include a different one of the stored unit data pieces accessed in association with the one of the stored unit data pieces and a second influence level at which the assumed set of unit data pieces affected by the relocation of the one of the stored unit data pieces includes the different one of the stored unit data pieces.

3. A non-transitory computer-readable storage medium storing a computer program that causes a computer to perform a procedure comprising:
calculating an evaluation value for each of a plurality of relocation process options generated based on an access pattern to a plurality of unit data pieces stored in a storage device, each of the generated relocation process options indicating a relocation of one or more of the stored unit data pieces within the storage device;
selecting, amongst a plurality of influence range levels, one influence range level based on the calculated evaluation values of the generated relocation process options and coefficients associated one-to-one with the influence range levels, the plurality of influence range levels indicating a plurality of assumed data ranges, each of the plurality of assumed data ranges being used to assume a set of unit data pieces whose access performances are affected by the relocation for each of the relocation process options;
determining, amongst the generated relocation process options, one or more relocation processes to be executed based on the selected influence range level; and
updating the coefficient associated with the selected influence range level based on status of access to the stored unit data pieces after the determined relocation processes are executed,
wherein the plurality of influence range levels include a first influence range level at which an assumed set of unit data pieces affected by the relocation of one of the stored unit data pieces does not include a different one of the stored unit data pieces accessed in association with the one of the stored unit data pieces and a second influence level at which the assumed set of unit data pieces affected by the relocation of the one of the stored unit data pieces includes the different one of the stored unit data pieces.

4. The non-transitory computer-readable storage medium according to claim 3, wherein the determining includes determining the relocation processes to be executed in such a manner that an assumed set of unit data pieces affected by one of the relocation processes does not overlap another assumed set of unit data pieces affected by another one of the relocation processes.

5. The non-transitory computer-readable storage medium according to claim 3, wherein the updating includes updating the coefficient based on the evaluation values of the executed relocation processes and the status of access to the stored unit data pieces.

6. A non-transitory computer-readable storage medium storing a computer program that causes a computer to perform a procedure comprising:
calculating an evaluation value for each of a plurality of relocation process options generated based on an access pattern to a plurality of unit data pieces stored in a storage device, each of the generated relocation process options indicating a relocation of one or more of the stored unit data pieces within the storage device;

calculating an index value for each of a plurality of influence range levels whose ranges in relation to unit data pieces to be affected by the relocation differ in extent of influence, by using a coefficient associated with the influence range level and the evaluation values of, amongst the generated relocation process options, one or more relocation process options whose ranges to be affected do not overlap each other, and selecting one influence range level based on the index values of the influence range levels;

determining, amongst the generated relocation process options, one or more relocation processes to be executed based on the extent of influence indicated by the selected influence range level; and updating the coefficient associated with the selected influence range level based on status of access to the stored unit data pieces after the determined relocation processes are executed.

7. A non-transitory computer-readable storage medium storing a computer program that causes a computer to perform a procedure comprising:

calculating an evaluation value for each of a plurality of relocation process options generated based on an access pattern to a plurality of unit data pieces stored in a storage device, each of the generated relocation process options indicating a relocation of one or more of the stored unit data pieces within the storage device;

selecting, amongst a plurality of influence range levels, one influence range level based on the calculated evaluation values of the generated relocation process options and coefficients associated one-to-one with the influence range levels, the plurality of influence range levels indicating a plurality of assumed data ranges, each of the plurality of assumed data ranges being used to assume a set of unit data pieces whose access performances are affected by the relocation, the selected influence range level being commonly applied to the plurality of relocation process options;

determining, amongst the generated relocation process options, one or more relocation processes to be executed based on the selected influence range level after selecting the influence range level; and updating the coefficient associated with the selected influence range level based on status of access to the stored unit data pieces after the determined relocation processes are executed:

the plurality of unit data pieces include a first unit data piece, a second unit data piece, and a third unit data piece that is related to the first unit data piece and the second unit data piece, the plurality of relocation process options include a first relocation process option that relocates the first unit data piece and a second relocation process option that relocates the second unit data piece, the calculating includes calculating a first evaluation value for the first relocation process option and a second evaluation value for the second relocation process option, the procedure further comprises calculating a first index value for a case where both the first relocation process option and the second relocation process option are executed, and a second index value for a case where the first relocation process option is executed but the second relocation process option is not executed, the first index value being based on the first evaluation value, the second evaluation value and a first one of the coefficients, the second index value being based on the first evaluation value and a second one of the coefficients, and the procedure further comprises determining whether the second relocation process option is to be executed according to a comparison between the first index value and the second index value.

\* \* \* \* \*